(12) United States Patent
Thomas

(10) Patent No.: US 8,868,103 B2
(45) Date of Patent: *Oct. 21, 2014

(54) METHOD AND SYSTEM FOR AUTHORIZED LOCATION MONITORING

(71) Applicant: IpVenture, Inc., Los Altos, CA (US)

(72) Inventor: C. Douglass Thomas, Saratoga, CA (US)

(73) Assignee: IpVenture, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/831,493

(22) Filed: Mar. 14, 2013

(65) Prior Publication Data

US 2013/0203388 A1    Aug. 8, 2013

Related U.S. Application Data

(60) Continuation of application No. 12/150,203, filed on Apr. 26, 2008, and a division of application No. 09/797,517, filed on Feb. 28, 2001, now Pat. No. 7,366,522.

(60) Provisional application No. 60/185,480, filed on Feb. 28, 2000.

(51) Int. Cl.
| | |
|---|---|
| *H04M 1/00* | (2006.01) |
| *H04W 4/02* | (2009.01) |
| *H04W 12/06* | (2009.01) |
| *H04W 8/14* | (2009.01) |
| *H04W 92/02* | (2009.01) |
| *H04W 8/08* | (2009.01) |
| *H04W 8/10* | (2009.01) |

(52) U.S. Cl.
CPC ............... *H04W 12/06* (2013.01); *H04W 8/14* (2013.01); *H04W 92/02* (2013.01); *H04W 4/02* (2013.01); *H04W 8/08* (2013.01); *H04W 8/10* (2013.01)

USPC ............... 455/456.1; 455/411; 455/404.2; 455/414.2

(58) Field of Classification Search
CPC ............................... H04W 64/00; H04W 4/02
USPC ................... 455/456.1, 404.2, 414.2
See application file for complete search history.

(56) References Cited

U.S. PATENT DOCUMENTS

| | | | |
|---|---|---|---|
| 4,719,920 | A | 1/1988 | Alt et al. |
| 5,337,579 | A | 8/1994 | Saia, III et al. |

(Continued)

FOREIGN PATENT DOCUMENTS

| | | |
|---|---|---|
| EP | 0 874 529 A2 | 10/1998 |
| EP | 1 037 447 A2 | 9/2000 |

(Continued)

OTHER PUBLICATIONS

U.S. Appl. No. 12/150,203, filed Apr. 26, 2008.

(Continued)

*Primary Examiner* — Nghi H Ly

(57) ABSTRACT

Techniques for location tracking, location utilization, and dissemination and management of location information are disclosed. As a location monitoring system, one embodiment includes at least a plurality of mobile computing devices supported by a wireless network, and a computing device coupled to a wired network (e.g., the Internet) that couples to the wireless network. Each of the mobile computing devices is associated with and proximate to an object whose location is being monitored. The computing device stores the locations of each of the mobile computing devices or the objects proximate thereto, and enables only authorized users to obtain access the locations via the wired network.

15 Claims, 8 Drawing Sheets

(56) References Cited

U.S. PATENT DOCUMENTS

| | | |
|---|---|---|
| 5,347,274 A | 9/1994 | Hassett |
| 5,389,934 A | 2/1995 | Kass |
| 5,400,020 A | 3/1995 | Jones et al. |
| 5,461,365 A | 10/1995 | Schlager et al. |
| 5,491,486 A | 2/1996 | Welles, II et al. |
| 5,512,902 A | 4/1996 | Guthrie et al. |
| 5,515,858 A | 5/1996 | Myllymaki |
| 5,528,247 A | 6/1996 | Nonami |
| 5,528,518 A | 6/1996 | Bradshaw et al. |
| 5,532,690 A | 7/1996 | Hertel |
| 5,539,748 A | 7/1996 | Raith |
| 5,541,845 A | 7/1996 | Klein |
| 5,550,551 A | 8/1996 | Alesio |
| 5,568,119 A | 10/1996 | Schipper et al. |
| 5,570,412 A | 10/1996 | LeBlanc |
| 5,576,716 A | 11/1996 | Sadler |
| 5,592,173 A | 1/1997 | Lau et al. |
| 5,598,460 A | 1/1997 | Tendler |
| 5,604,708 A | 2/1997 | Helms et al. |
| 5,623,260 A | 4/1997 | Jones |
| 5,623,418 A | 4/1997 | Rostoker |
| 5,629,678 A | 5/1997 | Gargano et al. |
| 5,633,874 A | 5/1997 | Diachina et al. |
| 5,650,770 A | 7/1997 | Schlager et al. |
| 5,652,570 A | 7/1997 | Lepkofker |
| 5,673,692 A | 10/1997 | Schulze et al. |
| 5,686,888 A | 11/1997 | Welles, II et al. |
| 5,710,551 A | 1/1998 | Ridgeway |
| 5,712,619 A | 1/1998 | Simkin |
| 5,731,757 A | 3/1998 | Layson, Jr. |
| 5,731,788 A | 3/1998 | Reeds |
| 5,742,233 A | 4/1998 | Hoffman et al. |
| 5,751,245 A | 5/1998 | Janky et al. |
| 5,771,001 A | 6/1998 | Cobb |
| 5,771,455 A | 6/1998 | Kennedy, III et al. |
| 5,774,876 A | 6/1998 | Woolley et al. |
| 5,797,091 A | 8/1998 | Clise et al. |
| 5,808,565 A | 9/1998 | Matta et al. |
| RE35,920 E | 10/1998 | Sorden et al. |
| 5,825,283 A | 10/1998 | Camhi |
| 5,826,195 A | 10/1998 | Westerlage et al. |
| 5,835,907 A | 11/1998 | Newman |
| 5,841,352 A | 11/1998 | Prakash |
| 5,844,862 A | 12/1998 | Cocatre-Zilgien |
| 5,850,196 A | 12/1998 | Mowers |
| 5,861,841 A | 1/1999 | Gildea et al. |
| 5,883,594 A | 3/1999 | Lau |
| 5,889,770 A | 3/1999 | Jokiaho et al. |
| 5,892,454 A | 4/1999 | Schipper et al. |
| 5,905,461 A | 5/1999 | Neher |
| 5,910,799 A | 6/1999 | Carpenter et al. |
| 5,913,078 A | 6/1999 | Kimura et al. |
| 5,917,433 A | 6/1999 | Keillor et al. |
| 5,918,180 A | 6/1999 | Dimino |
| 5,938,721 A | 8/1999 | Dussell et al. |
| 5,948,040 A | 9/1999 | DeLorme et al. |
| 5,948,043 A | 9/1999 | Mathis |
| 5,959,575 A | 9/1999 | Abbott |
| 5,959,577 A | 9/1999 | Fan et al. |
| 5,963,130 A | 10/1999 | Schlager et al. |
| 5,970,388 A | 10/1999 | Will |
| 5,982,285 A | 11/1999 | Bueche et al. |
| 5,982,807 A | 11/1999 | Snell |
| 5,983,108 A | 11/1999 | Kennedy, III et al. |
| 5,991,690 A | 11/1999 | Murphy |
| 5,995,849 A | 11/1999 | Williams et al. |
| 6,002,363 A | 12/1999 | Krasner |
| 6,002,982 A | 12/1999 | Fry |
| 6,009,319 A | 12/1999 | Khullar et al. |
| 6,013,007 A | 1/2000 | Root et al. |
| 6,014,080 A | 1/2000 | Layson, Jr. |
| 6,014,090 A | 1/2000 | Rosen et al. |
| 6,023,241 A | 2/2000 | Clapper |
| 6,031,496 A | 2/2000 | Kuittinen |
| 6,032,051 A | 2/2000 | Hall et al. |
| 6,034,622 A | 3/2000 | Levine |
| 6,054,928 A | 4/2000 | Lemelson et al. |
| 6,064,336 A | 5/2000 | Krasner |
| 6,067,018 A | 5/2000 | Skelton et al. |
| 6,067,044 A | 5/2000 | Whelan et al. |
| 6,072,396 A | 6/2000 | Gaukel |
| 6,078,290 A | 6/2000 | McBurney et al. |
| 6,083,248 A | 7/2000 | Thompson |
| 6,083,353 A | 7/2000 | Alexander |
| 6,094,168 A | 7/2000 | Duffett-Smith et al. |
| 6,100,806 A | 8/2000 | Gaukel |
| 6,101,710 A | 8/2000 | Selinger |
| 6,111,540 A | 8/2000 | Krasner |
| 6,115,595 A | 9/2000 | Rodal et al. |
| 6,121,921 A | 9/2000 | Ishigaki |
| 6,131,067 A | 10/2000 | Girerd et al. |
| 6,140,863 A | 10/2000 | Fujisawa |
| 6,141,570 A | 10/2000 | O'Neill, Jr. et al. |
| 6,144,303 A | 11/2000 | Federman |
| 6,148,280 A | 11/2000 | Kramer |
| 6,154,422 A | 11/2000 | Shinkawa et al. |
| 6,163,696 A | 12/2000 | Bi et al. |
| 6,171,264 B1 | 1/2001 | Bader |
| 6,172,640 B1 | 1/2001 | Durst et al. |
| 6,175,616 B1 | 1/2001 | Light et al. |
| 6,198,390 B1 | 3/2001 | Schlager et al. |
| 6,198,431 B1 | 3/2001 | Gibson |
| 6,198,930 B1 | 3/2001 | Schipper |
| 6,199,045 B1 | 3/2001 | Giniger et al. |
| 6,212,133 B1 | 4/2001 | McCoy et al. |
| 6,226,622 B1 | 5/2001 | Dabbiere |
| 6,231,519 B1 | 5/2001 | Blants et al. |
| 6,232,916 B1 | 5/2001 | Grillo et al. |
| 6,236,358 B1 | 5/2001 | Durst et al. |
| 6,238,337 B1 | 5/2001 | Kambhatla et al. |
| 6,243,039 B1 | 6/2001 | Elliot |
| 6,243,660 B1 | 6/2001 | Hsu et al. |
| 6,246,376 B1 | 6/2001 | Bork et al. |
| 6,252,543 B1 | 6/2001 | Camp |
| 6,259,944 B1 | 7/2001 | Margulis et al. |
| 6,263,280 B1 | 7/2001 | Stingone, Jr. |
| 6,278,936 B1 | 8/2001 | Jones |
| 6,281,797 B1 | 8/2001 | Forster |
| 6,282,362 B1 | 8/2001 | Murphy et al. |
| 6,282,495 B1 | 8/2001 | Kirkhart et al. |
| 6,292,687 B1 | 9/2001 | Lowell et al. |
| 6,298,306 B1 | 10/2001 | Suarez et al. |
| 6,300,875 B1 | 10/2001 | Schafer |
| 6,302,844 B1 | 10/2001 | Walker et al. |
| 6,304,467 B1 | 10/2001 | Nebrigic |
| 6,314,308 B1 | 11/2001 | Sheynblat et al. |
| 6,317,049 B1 | 11/2001 | Toubia et al. |
| 6,323,807 B1 | 11/2001 | Golding et al. |
| 6,324,213 B1 | 11/2001 | Harrison |
| 6,327,533 B1 | 12/2001 | Chou |
| 6,331,817 B1 | 12/2001 | Goldberg |
| 6,339,397 B1 | 1/2002 | Baker |
| 6,340,928 B1 | 1/2002 | McCurdy |
| 6,342,847 B1 | 1/2002 | Archuleta et al. |
| 6,349,257 B1 | 2/2002 | Liu et al. |
| 6,353,390 B1 | 3/2002 | Beri et al. |
| 6,353,798 B1 | 3/2002 | Green et al. |
| 6,356,841 B1 | 3/2002 | Hamrick et al. |
| 6,362,778 B2 | 3/2002 | Neher |
| 6,363,254 B1 | 3/2002 | Jones et al. |
| 6,363,323 B1 | 3/2002 | Jones |
| 6,373,430 B1 | 4/2002 | Beason et al. |
| 6,377,810 B1 | 4/2002 | Geiger et al. |
| 6,388,612 B1 | 5/2002 | Neher |
| 6,393,346 B1 | 5/2002 | Keith et al. |
| 6,404,352 B1 | 6/2002 | Ichikawa et al. |
| 6,407,698 B1 | 6/2002 | Ayed |
| 6,411,892 B1 | 6/2002 | Van Diggelen |
| 6,411,899 B2 | 6/2002 | Dussell et al. |
| 6,421,538 B1 | 7/2002 | Byrne |
| 6,426,719 B1 | 7/2002 | Nagareda et al. |
| 6,427,120 B1 | 7/2002 | Garin et al. |
| 6,430,602 B1 | 8/2002 | Kay et al. |
| 6,433,732 B1 | 8/2002 | Dutta et al. |

(56) References Cited

U.S. PATENT DOCUMENTS

| | | |
|---|---|---|
| 6,434,396 B1 | 8/2002 | Rune |
| 6,441,778 B1 | 8/2002 | Durst et al. |
| 6,442,380 B1 | 8/2002 | Mohindra |
| 6,442,391 B1 | 8/2002 | Johansson et al. |
| 6,443,890 B1 | 9/2002 | Schulze et al. |
| 6,445,937 B1 | 9/2002 | daSilva |
| 6,453,237 B1 | 9/2002 | Fuchs et al. |
| 6,463,272 B1 | 10/2002 | Wallace et al. |
| 6,466,821 B1 | 10/2002 | Pianca et al. |
| 6,469,639 B2 | 10/2002 | Tanenhaus et al. |
| 6,471,087 B1 | 10/2002 | Shusterman |
| 6,478,736 B1 | 11/2002 | Mault |
| 6,496,775 B2 | 12/2002 | McDonald, Jr. et al. |
| 6,505,048 B1 | 1/2003 | Moles et al. |
| 6,505,049 B1 | 1/2003 | Dorenbosch |
| 6,513,532 B2 | 2/2003 | Mault et al. |
| 6,522,871 B1 | 2/2003 | Patrick et al. |
| 6,522,889 B1 | 2/2003 | Aarnio |
| 6,529,164 B1 | 3/2003 | Carter |
| 6,544,193 B2 | 4/2003 | Abreu |
| 6,552,652 B2 | 4/2003 | Beken |
| 6,553,336 B1 | 4/2003 | Johnson et al. |
| 6,559,620 B2 | 5/2003 | Zhou et al. |
| 6,569,094 B2 | 5/2003 | Suzuki et al. |
| 6,571,193 B1 | 5/2003 | Unuma et al. |
| 6,579,231 B1 | 6/2003 | Phipps |
| 6,579,844 B1 | 6/2003 | Morrison et al. |
| 6,611,688 B1 | 8/2003 | Raith |
| 6,625,437 B1 * | 9/2003 | Jampolsky et al. ............ 455/405 |
| 6,630,885 B2 | 10/2003 | Hardman et al. |
| 6,640,085 B1 | 10/2003 | Chatzipetros et al. |
| 6,650,907 B1 | 11/2003 | Kamperschroer et al. |
| 6,661,372 B1 | 12/2003 | Girerd et al. |
| 6,665,534 B1 | 12/2003 | Conklin et al. |
| 6,679,071 B1 | 1/2004 | Storey et al. |
| 6,696,982 B2 | 2/2004 | Yoshioka et al. |
| 6,714,791 B2 | 3/2004 | Friedman |
| 6,721,542 B1 | 4/2004 | Anttila et al. |
| 6,741,927 B2 | 5/2004 | Jones |
| 6,747,675 B1 | 6/2004 | Abbott et al. |
| 6,748,318 B1 | 6/2004 | Jones |
| 6,788,766 B2 | 9/2004 | Logan |
| 6,801,853 B2 | 10/2004 | Workman |
| 6,804,606 B2 | 10/2004 | Jones |
| 6,847,892 B2 | 1/2005 | Zhou et al. |
| 6,856,804 B1 | 2/2005 | Ciotta |
| 6,865,385 B1 | 3/2005 | Kohda et al. |
| 6,937,900 B1 | 8/2005 | Pianca et al. |
| 6,952,645 B1 * | 10/2005 | Jones ........................... 701/465 |
| 6,975,941 B1 | 12/2005 | Lau et al. |
| 6,980,826 B2 | 12/2005 | Yamaguchi |
| 6,997,882 B1 | 2/2006 | Parker et al. |
| 7,010,144 B1 | 3/2006 | Davis et al. |
| 7,071,842 B1 | 7/2006 | Brady, Jr. |
| 7,085,253 B2 | 8/2006 | Yang |
| 7,110,773 B1 | 9/2006 | Wallace et al. |
| 7,136,832 B2 | 11/2006 | Li et al. |
| 7,187,278 B2 | 3/2007 | Biffar |
| 7,212,829 B1 | 5/2007 | Lau et al. |
| 7,218,938 B1 | 5/2007 | Lau et al. |
| 7,253,731 B2 | 8/2007 | Joao |
| 7,321,774 B1 | 1/2008 | Lau et al. |
| 7,366,522 B2 * | 4/2008 | Thomas .................... 455/456.1 |
| 7,403,972 B1 | 7/2008 | Lau et al. |
| 7,482,920 B2 | 1/2009 | Joao |
| 7,539,557 B2 | 5/2009 | Yamauchi |
| 7,809,377 B1 | 10/2010 | Lau et al. |
| 7,905,832 B1 | 3/2011 | Lau et al. |
| 7,953,809 B2 | 5/2011 | Lau et al. |
| 8,176,135 B2 | 5/2012 | Lau et al. |
| 8,285,484 B1 | 10/2012 | Lau et al. |
| 8,301,158 B1 * | 10/2012 | Thomas .................... 455/456.1 |
| 8,447,822 B2 | 5/2013 | Lau et al. |
| 8,611,920 B2 | 12/2013 | Lau et al. |
| 8,620,343 B1 | 12/2013 | Lau et al. |
| 8,700,050 B1 | 4/2014 | Thomas |
| 8,725,165 B2 | 5/2014 | Lau et al. |
| 2001/0006891 A1 | 7/2001 | Cho |
| 2001/0020204 A1 | 9/2001 | Runyon et al. |
| 2001/0027378 A1 | 10/2001 | Tennison et al. |
| 2001/0027525 A1 | 10/2001 | Gamlin |
| 2001/0028304 A1 | 10/2001 | I'Anson et al. |
| 2001/0044299 A1 | 11/2001 | Sandegren |
| 2001/0044332 A1 | 11/2001 | Yamada et al. |
| 2001/0047125 A1 | 11/2001 | Quy |
| 2001/0052849 A1 | 12/2001 | Jones, Jr. |
| 2002/0000930 A1 | 1/2002 | Crowson et al. |
| 2002/0016173 A1 | 2/2002 | Hunzinger |
| 2002/0027507 A1 | 3/2002 | Yarin et al. |
| 2002/0028988 A1 | 3/2002 | Suzuki et al. |
| 2002/0036593 A1 | 3/2002 | Ying |
| 2002/0038182 A1 | 3/2002 | Wong et al. |
| 2002/0049742 A1 | 4/2002 | Chan et al. |
| 2002/0050945 A1 | 5/2002 | Tsukishima et al. |
| 2002/0057192 A1 | 5/2002 | Eagleson et al. |
| 2002/0063622 A1 | 5/2002 | Armstrong et al. |
| 2002/0071677 A1 | 6/2002 | Sumanaweera |
| 2002/0077080 A1 | 6/2002 | Greene |
| 2002/0087260 A1 | 7/2002 | Hancock et al. |
| 2002/0087619 A1 | 7/2002 | Tripathi |
| 2002/0094067 A1 | 7/2002 | August |
| 2002/0111171 A1 | 8/2002 | Boesch et al. |
| 2002/0111819 A1 | 8/2002 | Li et al. |
| 2002/0115453 A1 | 8/2002 | Poulin et al. |
| 2002/0116080 A1 | 8/2002 | Birnbach et al. |
| 2002/0119770 A1 | 8/2002 | Twitchell et al. |
| 2002/0119789 A1 | 8/2002 | Friedman |
| 2002/0120475 A1 | 8/2002 | Morimoto |
| 2002/0140081 A1 | 10/2002 | Chou et al. |
| 2002/0173910 A1 | 11/2002 | McCall et al. |
| 2002/0193121 A1 | 12/2002 | Nowak et al. |
| 2003/0003943 A1 | 1/2003 | Bajikar |
| 2003/0009410 A1 | 1/2003 | Ramankutty et al. |
| 2003/0013445 A1 | 1/2003 | Fujiwara et al. |
| 2003/0068605 A1 | 4/2003 | Kullok et al. |
| 2003/0069759 A1 | 4/2003 | Smith |
| 2003/0095540 A1 | 5/2003 | Mulligan et al. |
| 2003/0151507 A1 | 8/2003 | Andre et al. |
| 2003/0163287 A1 | 8/2003 | Vock |
| 2003/0204132 A1 | 10/2003 | Suzuki et al. |
| 2004/0034470 A1 | 2/2004 | Workman |
| 2004/0046637 A1 | 3/2004 | Wesby Van Swaay |
| 2004/0114731 A1 | 6/2004 | Gillett et al. |
| 2004/0117108 A1 | 6/2004 | Nemeth |
| 2004/0233065 A1 | 11/2004 | Freeman |
| 2005/0250440 A1 | 11/2005 | Zhou et al. |
| 2006/0173444 A1 | 8/2006 | Choy et al. |
| 2007/0156286 A1 | 7/2007 | Yamauchi |
| 2008/0021645 A1 | 1/2008 | Lau et al. |
| 2008/0261636 A1 | 10/2008 | Lau et al. |
| 2009/0042540 A1 | 2/2009 | Bodnar et al. |
| 2011/0022533 A1 | 1/2011 | Lau et al. |
| 2011/0223884 A1 | 9/2011 | Lau et al. |
| 2012/0220266 A1 | 8/2012 | Lau et al. |
| 2013/0297524 A1 | 11/2013 | Lau et al. |

FOREIGN PATENT DOCUMENTS

| | | |
|---|---|---|
| EP | 1 037 447 A3 | 10/2001 |
| JP | 11-64482 | 3/1999 |
| JP | 11-258325 | 9/1999 |
| JP | 11-289574 | 10/1999 |
| JP | 11-306491 | 11/1999 |
| WO | WO 97/14054 | 4/1997 |
| WO | WO 97/41654 A1 | 11/1997 |
| WO | WO 98/01769 A1 | 1/1998 |
| WO | WO 98/16045 A1 | 4/1998 |
| WO | WO 98/40837 | 9/1998 |
| WO | WO 00/51391 | 8/2000 |
| WO | WO 01/45343 A2 | 6/2001 |
| WO | WO 01/50151 A1 | 7/2001 |
| WO | WO 01/63318 A1 | 8/2001 |
| WO | WO 01/75700 A2 | 10/2001 |

(56) References Cited

FOREIGN PATENT DOCUMENTS

| | | |
|---|---|---|
| WO | WO 02/42979 A1 | 5/2002 |
| WO | WO 02/084618 A1 | 10/2002 |
| WO | WO 03/012720 A1 | 2/2003 |

OTHER PUBLICATIONS

U.S. Appl. No. 12/150,126, filed Apr. 26, 2008.
Office Action for U.S. Appl. No. 09/797,517, dated Jan. 31, 2003.
Office Action for U.S. Appl. No. 09/797,517, dated Jan. 28, 2004.
Office Action for U.S. Appl. No. 09/797,517, dated Jun. 4, 2004.
Office Action for U.S. Appl. No. 09/797,517, dated Feb. 18, 2005.
Office Action for U.S. Appl. No. 09/797,517, dated Sep. 12, 2005.
Advisory Action for U.S. Appl. No. 09/797,517, dated Dec. 16, 2005.
Advisory Action for U.S. Appl. No. 09/797,517, dated Mar. 20, 2006.
Office Action for U.S. Appl. No. 09/797,517, dated Jun. 5, 2006.
Office Action for U.S. Appl. No. 09/797,517, dated Dec. 20, 2006.
Office Action for U.S. Appl. No. 09/797,517, dated Jul. 17, 2007.
Office Action for U.S. Appl. No. 09/797,517, dated Oct. 11, 2007.
Notice of Allowance for U.S. Appl. No. 09/797,517, dated Jan. 14, 2008.
Office Action for U.S. Appl. No. 12/150,126, dated Jan. 13, 2009.
Office Action for U.S. Appl. No. 12/150,126, dated Jul. 21, 2009.
Office Action for U.S. Appl. No. 12/150,126, dated Jan. 25, 2010.
Notice of Allowance for U.S. Appl. No. 12/150,126, dated Apr. 14, 2010.
Notice of Allowance for U.S. Appl. No. 12/150,126, dated Apr. 27, 2011.
Notice of Allowance for U.S. Appl. No. 12/150,126, dated Jul. 10, 2012.
Office Action for U.S. Appl. No. 12/150,203 dated May 6, 2010.
Office Action for U.S. Appl. No. 12/150,203, dated Nov. 12, 2010.
Final Office Action for U.S. Appl. No. 12/150,203, dated Apr. 25, 2011.
First Amended Complaint for Patent Infringement, EDTX, Case 1:10-cv-00547-RC, filed Sep. 24, 2010, pp. 1-29.
Complaint for Patent Infringement, NDCA, Case cv10-04755V HRL, filed Oct. 20, 2010, pp. 1-22, including Exhibit 17 (60 pgs.), Exhibit 27 (57 pgs.), and Exhibit 38 (54 pgs.) [total 193 pgs.].
Amended Complaint for Patent Infringement NDCA, Case No. cv10-4755 JSW, filed Feb. 4, 2011, pp. 1-23.
Answer to Amended Complain (AT&T), NDCA, Case No. cv10-4755 JSW, filed Feb. 18, 2011, pp. 1-15.
Answer to Amended Complain (Sprint), NDCA, Case No. cv10-4755 JSW, filed Feb. 18, 2011, pp. 1-15.
Answer to Amended Complain (Verizon), NDCA, Case No. cv10-4755 JSW, filed Feb. 18, 2011, pp. 1-22.
Preliminary Claim Constructions and Supporting Evidence for U.S. Patent No. 7,366,522 Pursuant to Patent L.R. 4-2, NDCA, Case CV 10-04755 JSW, filed Jun. 3, 2011, pp. 1-29, including Exhibit A.
Defendants Invalidity Contentions, NDCA, Case 3:10-cv-04755-JSW, filed May 3, 2011, pp. 1-1249, including Exhibit A (60 pgs.), Exhibit B (59 pgs.), Exhibit C (27 pgs.), Exhibit D (26 pgs.), Exhibit E (35 pgs.), Exhibit F (40 pgs.), Exhibit G (31 pgs.), Exhibit H (34 pgs.), Exhibit I (43 pgs.), Exhibit J (44 pgs.), Exhibit K-1 (49 pgs.), Exhibit K-2 (54 pgs.), Exhibit L-1 (50 pgs.), Exhibit L-2 (57 pgs.), Exhibit M1 (45 pgs.), Exhibit M-2 (54 pgs.), Exhibit N-1 (35 pgs.), Exhibit N-2 (51 pgs.), Exhibit O-1 (51 pgs.), Exhibit O-2 (36 pgs.), Exhibit P-1 (40 pgs.), Exhibit P-2 (39 pgs.), Exhibit Q-1 (36 pgs.), Exhibit Q-2 (42 pgs.), Exhibit R-1 (40 pgs.), Exhibit R-2 (43 pgs.), Exhibit S-1 (44 pgs.), Exhibit S-2 (41 pgs.).
Cellco Partnership's Proposed Terms for Construction, NDCA, Case 3:10-cv-04755-JSW, filed May 13, 2011, pp. 1-4.
Cellco Partnership's Preliminary Claim Constructions, NDCA, Case 3:10-cv-04755-JSW, filed Jun. 3, 2011, pp. 1-9.
Amended Final Joint Claim Construction Statement, NDCA, Case 3:10-cv-04755-JSW, filed Sep. 13, 2011, pp. 1-34.
Defendant AT&T Mobility, LLC's and Spring Spectrum and Nextel Operations' Proposed Terms and Claim Elements for Construction, NDCA, Case 3:10-cv-04755-JSW, filed May 13, 2011, pp. 1-4.
Defendant AT&T Mobility, LLC's and Sprint Spectrum and Nextel Operations' Exchange of Preliminary Claim Constructions and Extrinsic Evidence, NDCA, Case 3:10-cv-04755, filed Jun. 3, 2011, pp. 1-15.
Defendant AT&T Mobility LLC's, Sprint Spectrum LP's and Nextel Operations' Responsive Claim Construction Brief, NDCA, Case 3:10-cv-04755-JSW, filed Sep. 2, 2011, pp. 1-210, including Exhibit 1 (13 pgs.), Exhibit 2 (15 pgs.), Exhibit 3 (16 pgs.), Exhibit 4 (14 pgs.), Exhibit 5 (13 pgs.), Exhibit 6 (15 pgs.), Exhibit 7 (12 pgs.), Exhibit 8 (5 pgs.), Exhibit 9 (9 pgs.), Exhibit 10 (2 pgs.), Exhibit 11 (12 pgs.), Exhibit 12 (13 pgs.), Exhibit 13 (12 pgs.), Exhibit 14 (3 pgs.), Exhibit 15 (3 pgs.), Exhibit 16 (4 pgs.).
Defendants' Objections to IpVenture's Claim Construction Reply Brief Evidence, NDCA, Case 3:10-cv-04755-JSW, filed Sep. 20, 2011, pp. 1-22.
Plaintiff IpVenture, Inc.'s Reply Claim Construction Brief, NDCA, Case 3:10-cv-04755-JSW, filed Sep. 13, 2011, pp. 1-36.
Plaintiff IpVenture, Inc.'s First Amended Responses to Defendant AT&T Mobility LLC's Second Set of Interrogatories to Plaintiff (No. 7), NDCA, Case 3:10-cv-04755 JSW, filed Aug. 29, 2011, pp. 1-8.
Plaintiff IpVenture, Inc.'s Answers to Defendant AT&T Mobility LLC's Third Set of Interrogatories to Plaintiff (No. 10), NDCA, Case 3:10-cv-04755 JSW, filed Aug. 12, 2011, pp. 1-15.
Plaintiff IpVenture, Inc.'s Answers to Defendant AT&T Mobility, LLC's Second Set of Interrogatories (Nos. 7-9), NDCA, Case 3:10-cv-04755 JSW, filed Jun. 7, 2011, pp. 1-10.
Plaintiff IpVenture, Inc.'s Responses to Defendant Cellco Partnership's First Set of Interrogatories (Nos. 1-14), NDCA, Case 3:10-cv-04755 JSW, filed Apr. 18, 2011, pp. 1-49.
Plaintiff IpVenture, Inc.'s Opening Claim Construction Brief, NDCA, Case No. C 10-04755 JSW, filed Aug. 12, 2011, pp. 1-24.
Docket Listing, NDCA, Case 3:10-cv-04755-JSW, printed Jan. 6, 2012, pp. 1-12.
"352C22 Miniature Low Profile ICP Accelerometer," Precision Accelerometers, PCB Piezoelectronics Products—SVS Division, webpages, pp. 1-2 (downloaded Apr. 11, 2002: www.pcb.com/products/sys/sys352c22.html).
"3G Mobile Internet Revolution, . . . only with Location Based Services!" pp. 1, (downloaded Aug. 10, 2002: http://webhome.idirect.com/~dental/3glocator/home.htm).
"Airline Cargo Containers," Case Study, RJI Incorporated, webpages, pp. 1-2 (downloaded Mar. 16, 2002: www.rji.cc/casestudies/airlinecargocontainers.html).
"Airline Food Carts," Case Study, RJI Incorporated, webpages, pp. 1-2 (downloaded Mar. 16, 2002: www.rji.cc/casestudies/airlinefoodcarts.html).
"An Introduction to SnapTrack Server-Aided GPS Technology," SnapTrack Inc., Apr. 3, 2007.
Archived page entitled "Money-Back Guarantee Policy" from fedex.com, archived by the Internet Archive on Aug. 17, 2000.
"Audiovox Intros GPS, Bluetooth Phone;" INT Media Group, Inc. (allNetDevices), Apr. 5, 2002. (downloaded: www.allnetdevices.com/wireless/news/2001/1/15/audiovox_intros.html).
"Carrier and end-user applications for wireless location systems," TruePosition, Inc., http://www.trueposition.com/spie_app.htm, downloaded, Jul. 30, 2000, pp. 1-7.
"Danger—Products" and "Hiptop Communicator Brochure," Danger, Inc., downloaded Oct. 26, 2003: www.danger.com/products.php).
"Developing a GPSs for the Global Supply Chain," Aberdeen Group, Inc., Executive White Paper, Jun. 2002.
"Devices for Text Messages in Deutsche Telekom's fixed network have already found their way into many households," Deutsche Telekom AG, Press Release, Mar. 13, 2002, pp. 1-2.
"Digital/Analog Compass Sensors" and "1655 Digital Compass Sensor," webpages, The Robson Company, Inc., pp. 1-2 (downloaded Apr. 11, 2002: www.dinsmoresensors.com/index.html).
"EarthTrack™ Vehicle Tracking Systems," Outfitter Satellite, Inc., 1998 (downloaded Jan. 22, 2000).
"Enhanced Tracking," United Parcel Service of America, Inc. (UPS), webpages, pp. 1-2 (downloaded Jun. 1, 2002: www.ups.com/myupsinfo/info/etrack?pnav=stdservice).

(56) References Cited

OTHER PUBLICATIONS

"Fleet Management Systems-Asset Tracking Devices," Axiom Navigation Inc., 2000-2001 (downloaded Oct. 19, 2002: www.axiomnav.com/Prod_Systems/prod_system.asp).
"Frozen Food Warehouse," Case Study, RJI Incorporated, webpages, pp. 1-3 (downloaded Mar. 16, 2002: www.rji.cc/casestudies/frozenfoodwarehouse.html).
"FunMail Launches on the NTT DoCoMo i-mode network," FunMail, Press Release, May 1, 2001, pp. 1-2.
"Global Cell Phone Location," Axiom Navigation Inc., 2000-2001 (downloaded Oct. 19, 2002: www.axiomnav.com/Prod_Global/prod_global.asp).
"Global Locating Services," SkyBitz, webpage, p. 1, (downloaded Nov. 15, 2002: www.skybitz.com/services/gls.html).
"GLS Communicator," SkyBitz, webpages, pp. 1-2, (downloaded Nov. 15, 2002: www.skybitz.com/gls/communicator.html).
"Guide to Tracking Info.," Nippon Express, website page, p. 1 (downloaded Jun. 9, 2002: www.nittsu.co.jp/edoc/howtoe.htm).
"Introduction to SMS," by C. Tull of AnywhereYouGo.com, pp. 1-4 (downloaded:www.devx.com/wireless/articles/SMS/SMSintro-asp).
"IO Data Develops GPS Adapter for I-Mode Mobile," AsiaBizTech, Sep. 17, 2002, pp. 1-2.
"Locate Networks: Our Service," Locate Networks, webpages, pp. 1-7 (downloaded Sep. 26, 2002: www.locatenetworks.com/).
"MMS phones: Don't believe the hype," CNN.com/SCI-TECH, Aug. 8, 2002, pp. 1-3.
"Mobile Location Based Services: Cell Tracking Devices of People & Thongs . . . ," pp. 1-2, (downloaded Aug. 10, 2002: http://3glocate.com).
"MoniTrack," Case Study, RJI Incorporated, webpages, pp. 1-2 (downloaded Mar. 16, 2002: www.rji.cc/technology/telematic.html).
"My UPS.COM Benefits," United Parcel Service of America, Inc. (UPS), webpage, p. 1 (downloaded Apr. 13, 2002: www.ups.com/myupsinfo/info/benefits?pnav=stdsservice).
"NavMate® Navigation System," Visteon Corporation, webpage, pp. 1-2 (downloaded Jun. 21, 2002: www.visteon.com/technology/automotive/navmate.html).
"News," SkyBitz, webpages, pp. 1-8, (downloaded Nov. 15, 2002: www.skybitz.com/about/news.html).
"Pakhound: Your Watchdog in the Shipping Industry," website pages, pp. 1-3 (downloaded Jun. 9, 2002: www.pakhound.com/fact.asp).
"Parkwatch and Wherenet Unveil the First Amusement Visitor Locating system," ParkWatch, Press Release, Jun. 27, 2000.
"pulver.com's Location Based Services Report," pulver.com, Inc., Oct. 2001, pp. 1-17 (downloaded Jun. 4, 2002: www.pulver.com/lbsreport/lastbsreport.02/oct01.txt).
"Radio Frequency Identification (RFID)," Case Study, RJI Incorporated, webpage, p. 1 (downloaded Mar. 16, 2002: www.rji.cc/technology/rfid.html).
"Real Time Location System (RTLS)," Case Study, RJI Incorporated, webpage, p. 1 (downloaded Mar. 16, 2002: www.rji.cc/technology/rtls.html).
"Real-Time Warehouse Tracking," Case Study, RJI Incorporated, webpages, pp. 1-2 (downloaded Mar. 16, 2002: www.rji.cc/casestudies/rtwarehousetracking.html).
"Savi Reusable Transport Container," Savi Technology, Inc., Apr. 30, 2002, pp. 1-2.
"Send images to i-mode phones," Mobile Media Japan, 2001, pp. 1-3.
"Ski Rental with Auto ID and Tracking," Case Study, RJI Incorporated, webpages, pp. 1-2 (downloaded Mar. 16, 2002: www.rji.cc/casestudies/skirentalcompany.html).
"SnapTrack and SignalSoft Corp. Team Up to Trial Location-based Information Service for GSM Test Group," Press Release, SnapTrack Inc., Dec. 6, 1999.
"SnapTrack Awarded Additional Key Patents for Enhanced GPS System," Press Release, SnapTrack Inc., Jan. 4, 2000.
"Start-up crams single chip with phone, GPS and Bluetooth," CNET Network, Inc. (ZDNET), Mar. 22, 2002 (downloaded: http://news.zdnet.co.uk/story/0,t284-x2107163,00.html).
"Status Icons/Messages," Yahoo! Messenger Help, Yahoo! Inc., 2002, pp. 1-2.
"Technical Applications of Our Current Technology," Aetherwire, webpages, pp. 1-4 (downloaded Mar. 16, 2002: www.aetherwire.com/CDROM/General/appl1.html).
"The Always on Network," Position Paper, Nortel Networks, 2002.
"Theme Park Visitors & Cashless Purchasing," Case Study, RJI Incorporated, webpages, pp. 1-2 (downloaded Mar. 16, 2002: www.rji.cc/casestudies/themepark.html).
"Track Shipments—Detailed Results," FedEx, webpages, pp. 1-2 (downloaded Oct. 29, 2002: www.fedex.com).
"Track Your FedEx Shipments via Email," FedEx, webpages, pp. 1-2 (downloaded Oct. 29, 2002: www.fedex.com).
"Tracking Helpful Tips," United Parcel Service of America, Inc. (UPS), webpages, pp. 1-2 (downloaded Jun. 1, 2002: www.ups.com/tracking/nm_help.html).
"Trimble and Rosum Team to Develop Universal Positioning Technology," Trimble Navigation, Inc., News Release, Feb. 27, 2003.
"Turning Position Into Knowledge," SkyBitz, webpage, p. 1, (downloaded Nov. 15, 2002: www.skybitz.com).
"UPS Package Tracking," United Parcel Service of America, Inc. (UPS), webpages, pp. 1- 2 (downloaded Apr. 13, 2002: www.ups.com/tracking/tracking.html).
"UPS Wireless Solutions," United Parcel Service of America, Inc. (UPS), webpage, p. 1 (downloaded Apr. 13, 2002: www.ups.com/myupsinfo/info/wireless?pnav=stdsservice).
"Welcome to Iship, Inc.," iShip, Inc., webpages, pp. 1-2, (downloaded Jun. 9, 2002: www.iship.com/).
"Welcome to Traker Systems," Tracker Systems, webpages, pp. 1-2 (downloaded Jun. 9, 2002: www.trakersystems.com).
"What are Instant Messages?" Yahoo! Messenger Help, Yahoo! Inc., 2002, pp. 1.
"What is "3G" technology?," CNN.com/SCi-TECH, Oct. 22, 2001, pp. 1-3.
"What is a Friend List?" Yahoo! Messenger Help, Yahoo! Inc., 2002, pp. 1.
"Wherify Wireless and SiRF Team to Deliver Child Locator System," Wherify Wireless, Inc., Press Release, Mar. 19, 2001, pp. 1-2.
"Wherify Wireless Breakthrough in Location-Based Services," Mobilemag.com, Feb. 28, 2001, p. 1.
"Wherify Wireless GPS Locator for Kids User Guide," Wherify Wireless, Inc., 2003, pp. 1-106.
"Wherify Wireless Location Services," Wherify Wireless, Inc., webpages, pp. 1-5 (downloaded: Mar. 25, 2003: www.wherifywireless.com/prod_watches.htm).
"X-GPS™—Hybrid GPS Location Server Solution," Axiom Navigation Inc., 2000-2001 (downloaded Oct. 19, 2002: www.axiomnay.com/Prod_Global/x-gps.asp).
"Yahoo! Messenger—Sending Messages to a Mobile Phone,"Yahoo! Messenger, Yahoo! Inc., 2002, pp. 1-7 (downloaded Oct. 27, 2002: http://messenger.yahoo.com/messenger/wireless/pc2sms/tour1.html(through /tour7.html)).
"Yahoo! Messenger for Text Messaging,"Yahoo! Messenger, Yahoo! Inc., 2002, pp. 1-10 (downloaded Oct. 27, 2002: http://messenger.yahoo.com/messenger/wireless/smsmsgr/tour1.html (through /tour7.html)).
"Yahoo! Messenger for WAP," Yahoo Messenger, Yahoo! Inc., 2002 (tours 1-9), pp. 1-17 (downloaded Oct. 27, 2002: www.messenger.yahoo.com/messenger/wireless/wap/tour1.html(through /tour9.html)).
Accelerometers—General Purpose, LP Series, Crossbow Technology, Inc., data sheet, pp. 1-3 (downloaded Apr. 11, 2002: www.xbow.com/Products/Accelerometers.htm).
Bickers, "Eyes in the sky," SafeTzone Technology Corporation, webpages, 2001, pp. 1-3 (downloaded: www.safetzone.com/newsKiosk.asp).
Chertkoff, Rachel, "Vehicle Locator Systems," Pager Technology, pp. 1-2, 1998.
Commercial Uses for LoJack (webpage), LoJack Corporation, downloaded Jan. 22, 2000.
Crossbow Product Guide—Accelerometers, Crossbow Technology, Inc., webpages, pp. 1-3 (downloaded Apr. 11, 2002: www.xbow.com/Products/Accelerometers.htm).

(56) References Cited

OTHER PUBLICATIONS

Culler et al., *MICA: The Commercialization of Microsensor Motes*, Sensors, vol. 19, No. 4 (Apr. 1, 2002).
Darabi et al., *A 2.4-GHz CMOS Transceiver for Bluetooth*, IEEE Journal of Solid-State Circuits, vol. 36, No. 12 (Dec. 2001).
Delphi and MobileAria Demonstrate True Hands Free In-Vehicle Mobile Productivity Services At CES, Press Release, Delphi Automotive Systems, Jan. 8, 2002 (downloaded Apr. 5, 2002: www.delphiauto.com/news/pressRelease/pr6828-01082002).
F. Rivera, "Special Report: Keeping Tabs on Your Teen," 7 News, Boston, Apr. 30, 2002, pp. 1-3.
FedEx Insight, FedEx, webpages, pp. 1-11 (downloaded Oct. 29, 2002: www.fedex.com).
J. Fraden, Handbook of Modern Sensors, Springer-Verlag (1996).
GPS2000, Omega Research and Development, Inc., webpages, pp. 1-9 (pp. 7-9 pertain to an online tour) (downloaded Jul., 14, 2003: www.gps2000online.com/).
Grimes, Craig A., et al., *Wireless Magnetoelastic Resonance Sensors: A Critical Review*, Sensors (Jul. 23, 2002).
Helfenstein et al. Circuits and Systems for Wireless Communications, Kluwer Academic Publishers (2000).
Hill et al., *System Architecture Directions for Networked Sensors*, ACM/ASPLOS-IX (Nov. 2000).
IMVironment, Yahoo! Messenger Yahoo! Inc., 2002, pp. 1-12 (downloaded (including) Oct. 27, 2002: http://help.yahoo.com/help/us/mesg/imv/imv-01.html(through /index5.html).
J.Wrolstad, "Chrysler Claims First With Bluetooth Mobile Phone System," Wireless Newsfactor, Oct. 26, 2001.
K. Hill, "Prada Uses Smart Tags to Personalize Shopping," CRMDaily.com, Apr. 24, 2002, pp. 1-4.
Madou, Marc J., Fundamentals of Microfabrication, CRC Press (2002).
K. Miyake, "Sharp to unveil 3G PDA-type cell phone," ITworld.com, Inc., Jan. 11, 2002.
Kleinknecht, William, "Juvenile authorities want satellite tracking for felons," The Star-Ledger of New Jersey, Nov. 18, 1997.
LoadTrak, pp. 1-2 (downloaded Jun. 4, 2002: www.load-trak.com).
Mainwaring et al., *Wireless Sensor Networks for Habitat Monitoring*, ACM (Sep. 28, 2002).
Marek, "The Unstoppable SnapTrack," Wireless Week, Dec. 18, 2000.
Motorola Consumer Catalog: Pagers (webpage), Motorola, Inc., downloaded Jan. 19, 2000.
My.Roadway!, Roadway Express, Inc., webpages, pp. 1-2, (downloaded Jun. 9, 2002: www.quiktrak.roadway.com/cgi-bin/quiktrak).
Packtrack™, PackTrack.com, webpages, pp. 1-2 (downloaded Jun. 9, 2002: www.packtrack.com).
Precision Accelerometers, PCB Piezoelectronics Products—SVS Division, webpages, pp. 1-2 (downloaded Apr. 11, 2002: www.pcb.com/products/sys/index.html).
Rabinowitz and Spilker, Jr., "A New Positioning System Using Television Synchronization Signals," Rosum Corporation, pp. 1-11 (downloaded May 21, 2003).
Rabinowitz and Spilker, Jr., "Positioning Using the ATSC Digital Television Signal," Rosum Corporation Whitepaper, Rosum Corporation (downloaded May 21, 2003).
Razavi, Behzad, RF Microelectronics, Prentice Hall (1998).
Real Time Locating System, Executive Summary, Technology Systems International, Inc., 2007.
Rofougaran et al., *A Single-Chip 900-MHz Spread-Spectrum Wireless Transceiver in 1-μm CMOS-Part II: Receiver Design*, IEEE Journal of Solid-State Circuits, vol. 33, No. 4 (Apr. 1998).
Ryan, "Catching up with Dick Tracy," San Francisco Chronicle, news article, Mar. 18, 2002.
SandPiper GPS Receiver, Specification sheet by Axiom Navigation Inc. (www.axiomnav.com) 2006.
Senturia, Stephen D., Microsystem Design, Kluwer Academic Publishers (2001).
Smart Antenna, Specification sheet by Axiom Navigation Inc. (www.axiomnav.com) 2008.
SnapTrack—Privacy Protection (webpage), SnapTrack Inc., downloaded Jan. 19, 2000.
SnapTrack—Technology At Work (webpage), SnapTrack Inc., downloaded Jan. 19, 2000.
SnapTrack in Action (webpage), SnapTrack Inc., downloaded Jan. 19, 2000.
Steyaert et al., "A 2-V CMOS Cellular Transceiver Front-End," *IEEE Journal of Solid-State Circuits*, vol. 25, No. 12, Dec. 2000, pp. 1895-1907.
Stilp, Louis A., "Examining the Coming Revolution in Location Services," pp. 1-11.
Strom, Stephanie. "A Wild Sleigh Ride at Federal Express," The New York Times, Dec. 20, 1994.
Swift A2 GPS Receiver, Specification sheet by Axiom Navigation Inc. (www.axiomnav.com) 2010.
Swift B2 GPS Receiver, Specification sheet by Axiom Navigation Inc. (www.axiomnav.com) 2010.
TruePosition Virtual Brochure (webpage), TruePosition, Inc.
Wong, "Fishers, golfers join the rush to GPS," San Jose Mercury News, news article, Mar. 25, 2002.
Appenzeller, et al., "The Mobile People Architecture", Technical Report: CSL-TR-00000, Computer Systems Laboratory, Departments of Electrical Engineering and Computer Science, Stanford University, Jan. 1999, pp. 1-13.
Calsyn, Martin and Desseault, Lisa, "Presence Information Protocol Requirements," Internet Draft, Feb. 9, 1998, pp. 1-27.
J. Rosenberg, H. Schulzrinne, Internet Draft, "SIP for Presence," http://www.alternic.org/drafts/drafts-r-s/draft-rosenberg=sip-pip-00.txt, Nov. 13, 1998, Bell Laboratories, Columbia, pp. 1-31.
Danger Product Overview, Danger, Inc., date unknown, 5 pgs.
PCV*trak*™ Installation and Operator's Manual, Trimble Navigation, 24623-00 Rev. A, May 1994, pp. 1-259.
"Advanced Traveler Aid Systems for Public Transportation," Final Report, Federal Transit Administration, Sep. 1994, pp. 1-131.
Campbell, Laurel, "SECURITY—Military satellite enlisted to thwart car crime," The Commercial Appeal, Sep. 26, 1996, pp. 5B.
Law, Alex, "Week in Wheels/ . . . From a Driver's Notebook," Newsday, Inc., Sep. 20, 1996, pp. C03.
Cortez, Angela, "Springs police can track thief, vehicles," The Denver Post, Sep. 10, 1996, pp. B-01.
"OnGuard Tracker Nabs Auto Burglar," Global Positioning & Navigation News, vol. 6, No. 16, Aug. 8, 1996.
"OnGuard Tracker Nabs Auto Burglar," Section: Financial News, PR Newswire, Jul. 29, 1996.
Nauman, Matt, "Pressing the Panic Button: Car Security Enters a New Age with Cellular Phones and Satellites that Watch Over You," San Jose Mercury News, Jun. 21, 1996, pp. 1G.
"Monday Briefing" San Antonio Express-News, p. 1, Part B, Jun. 10, 1996.
"OnGuard Tracker Makes Debut on 'One Lap of America'," PR Newswire, Jun. 7, 1996.
"OnGuard Tracker Makes Debut on 'One Lap of America'," Southwest Newswire, Jun. 7, 1996.
Dominguez, Raul, "Women get their day in sun—American Golf planning events nationwide May 18," San Antonio Express-News, Apr. 18, 1996, pp. 2, part B.
"Vehicle Navigation Units Being Measured in Luxury Autos," Global Positioning & Navigation News, vol. 6, No. 7, Apr. 4, 1996.
"Advanced Business Sciences, Inc. Announces Completion of Acquisition of Comguard of Illinois," Business Wire, Aug. 26, 1998.
"Advanced Business Sciences, Inc. Announces Filing With Securities and Exchange Commission," Business Wire, Jun. 25, 1999.
"Advanced Business Sciences, Inc. Announces Preliminary Fourth Quarter 1998 Revenue Results," Business Wire, Feb. 4, 1999.
"Business People Burnsy's Grill Names Two," Omaha World-Herald, Section Business, p. 4M, Oct. 20, 1996.
"Company Sees Prisoner Tracking and Monitoring Market Niche," Global Positioning & Navigation News, vol. 6, No. 10, May 16, 1996.
GPS-Based Personal Monitoring Systems Offered to Corrections, Private Market, Global Positioning & Navigation News, vol. 8, No. 11, Jun. 3, 1998.
GPS tracks parolees, probationers, Corrections Professional, vol. 5, No. 6, Nov. 19, 1999.

(56) References Cited

OTHER PUBLICATIONS

High-Tech System Tracks Offenders—Satellites Watching Criminals, Business Wire, Nov. 14, 1997.
Briefs, Global Positioning & Navigation News, vol. 9, No. 4, Feb. 24, 1999.
Dunkelberger, Lloyd, "Lawmakers question criminal-tracking system," Sarasota Herald-Tribune (Florida), pp. 16A, Nov. 28, 1999.
Powell, Barbara. "New gadgets help drivers find their way," Fort Worth Star-Telegram (Texas), p. 1, Jan. 20, 1997.
"New Service Lets Corrections Agencies Track Offenders by Satellite," PR Newswire, Jan. 11, 1999.
"New Service Lets Corrections Agencies Track Offenders by Satellite; SecurityLink Offers "GPS" Tracking for Offenders on Electronic Monitoring—Sandusky Municipal Court Adopts Technology for Local Offenders," PR Newswire, Jan. 12, 1999.
"New Service Lets Corrections Agencies Track Offenders by Satellite; SecurityLink Offers 'Gps' Tracking for Offenders on Electronic Monitoring," PR Newswire, Section: Financial News, Jan. 11, 1999.
"New Service Lets Corrections Agencies Track Offenders by Satellite," Satellite Today, vol. 2, No. 8, Jan. 13, 1999.
"Prisoner Security Monitoring Company Grabs Contracts for GPS-Based System," Global Positioning & Navigation News, vol. 7, No. 1, Jan. 15, 1997.
Atwater, Andi, "Proposal seeking 24-hour tracking of all sex offenders," The News-Press (Fort Meyers, FL), pp. 1A, Feb. 20, 2000.
Briefs, Global Positioning & Navigation News, vol. 9, No. 3, Feb. 10, 1999.
Brauer, David, "Satellite 'Big Brother' Tracks Ex-Inmates; Agencies Experiment with GPS to Monitor Parolee Whereabouts," Chicago Tribune, Section: News, p. 31, Dec. 18, 1998.
"Satellite Spotlight; Eye in the Sky to Monitor Parolees," Satellite News, vol. 21, No. 15, Apr. 13, 1998.
"Satellite Spotlight: Fighting Crime From Space," Satellite News, vol. 19, No. 20, May 13, 1996.
Prohaska, Thomas J, "Satellite Will Keep Tabs on Convicts," Buffalo News (New York), Section: Local, p. 5B, Sep. 20, 1999.
"Sierra Wireless and Pro Tech Team Up on Monitoring Product," Global Positioning & Navigation News, vol. 8, No. 8, Apr. 22, 1998.
Anderson, Larry, "Technology rules at Securing New Ground," Access Control & Security Systems Integration, Section: Industry Outlook; ISSN 1084-6425, Dec. 1999.
Trimble Navigation Warns 2nd-Quarter Earnings to Miss Target, Dow Jones Business News, Jul. 10, 1998.
"Trimble Navigation's Net Income Skidded 93% Amid Order Delays," Dow Jones Business News, Jul. 23, 1998.
Briefs, Global Positioning & Navigation News, vol. 9, No. 2, Jan. 27, 1999.
Briefs, Global Positioning & Navigation News, vol. 9, No. 14, Jul. 14, 1999.
Dailey et al. "Automatic Transit Location System," Final Research Report, 55 pgs., Feb. 1996.
Maguire, Jr. et al. "SmartBadges: a wearable computer and communication system," codes/CASHE '98, 47 pgs., 1998.
Koshima et al. "Personal locator services emerge," IEEE Spectrum, Feb. 2000, pp. 41-48.
Zygowicz et al. "State of the Art in Automatic Vehicle Location Systems," Center for Urban Transportation Studies, University of Wisconsin, Milwaukee, Feb. 1998.
Ashworth, Jon. "Big brother is watching you," The Times (London), Section: Features, May 7, 1999.
"Car Thieves Take the "Bait" in Michigan; Two Suspects Reeled in With OnGuard," Business Wire, Sep. 11, 1997.
Sauer, Matthew, "Company Finds Niche by Giving Directions . . . " Sarasota Herald-Tribune (Florida), Section: Business Weekly, p. 1, Jul. 7, 1997.
"ATX Technologies Signs Nationwide Service Deal with AT&T," Global Positioning & Navigation News, vol. 7, No. 9, May 7, 1997.
"Car Thieves Take the 'Bait' in Tulsa; Two Suspects Caught Off Guard with OnGuard Once Again," PR Newswire, Section: Financial News, Jan. 8, 1997.
"Car Thieves Take the 'Bait' in Tulsa; Two Suspects Caught Off Guard with on Guard," PR Newswire, Section: Financial News, Dec. 9, 1996.
Jackson, Terry, "Smart Cars Whether by Satellite or the Internet, High-Tech Devices and Services May Make Crumpled Road Maps a Thing of the Past," The Miami Herald, Section: Travel, p. 1J, Oct. 6, 1996.
"San Antonio Personal Security Company Links Up with Senior PGA Golfer," PR Newswire, Section: Financial News, Apr. 1, 1996.
"San Antonio Personal Security Company Links Up with Senior PGA Golfer," Southwest Newswire, Apr. 1, 1996.
Business Briefs, San Antonio Express-News, Mar. 25, 1996.
"ATX Research Signs Exclusive Sales Agreement with Arizona Company," PR Newswire, Mar. 21, 1996.
"ATX Research Signs Exclusive Sales Agreement with Arizona Company, "Southwest Newswire, Mar. 21, 1996.
"Automotive GPS Satellite/Safety System Race Is On," Southwest Newswire, Feb. 20, 1996.
"Dealerships Can Track Down New Aftermarket Revenues," PR Newswire, Feb. 9, 1996.
"ATX Research Unveils New Stealthtrac Capability," PR Newswire, Feb. 9, 1996.
"Dealerships Can Track Down New Aftermarket Revenues," Southwest Newswire, Feb. 9, 1996.
Briefs, Global Positioning & Navigation News Wire, vol. 6, No. 2, Jan. 24, 1996.
"ATX Research Provides Police Departments With Onguard Personal Security and Vehicle Tracking System," PR Newswire, Jan. 15, 1996.
"ATX Research Provides Police Departments With Onguard Personal Security and Vehicle Tracking System," Southwest Newswire, Jan. 15, 1996.
"ATX Research Relocates to New Corporate Headquarters," PR Newswire, Dec. 12, 1995.
"ATX Research Relocates to New Corporate Headquarters," Southwest Newswire, Dec. 12, 1995.
"Texas invention tracks stolen cars, lets driver call for help," The Vancouver Sun, Oct. 20, 1995.
"San Antonio Company Unveils Satellite/Cellular Personal Security System," PR Newswire, Oct. 3, 1995.
"San Antonio Company Unveils Satellite/Cellular Personal Security System," Southwest Newswire, Oct. 3, 1995.
Notice of Allowance for U.S. Appl. No. 12/150,203, dated Nov. 7, 2013.
Package, Dictionary.com, http://dictionary.reference.com/browse/package (last accessed Nov. 6, 2013), 3 pgs.
SiRF Debuts Revolutionary Architecture and Technologies to Further Drive GPS into the Mainstream, SiRF.com, Aug. 16, 1999 (archived Dec. 22, 1999), http://web.archive.org/web/19991222194810/http:/www.sirf.com/as_prss2_3.htm, 4 pgs.

* cited by examiner

500

| MD | USER | SUPERVISOR | PASSWORD | LOGGED_IN |
|----|------|------------|----------|-----------|
| 1  | John | Barb       | 1234     | 1         |
| 2  | Jane | Bill       | 5678     | 0         |

| MD | CURRENT LOCATION | PREVIOUS LOCATION |
|----|------------------|-------------------|
| 1  | XXX              | YYY               |
| 2  | WWW              | ZZZ               |

FIG. 5B

METHOD AND SYSTEM FOR AUTHORIZED LOCATION MONITORING

CROSS-REFERENCE TO RELATED APPLICATIONS

This application is a continuation application of U.S. patent application Ser. No. 12/150,203, filed Apr. 26, 2008 and entitled "METHOD AND SYSTEM FOR AUTHORIZING LOCATION MONITORING" (now U.S. Pat. No. 8,700,050), which is hereby incorporated by reference herein, which in turn is a divisional application of U.S. patent application Ser. No. 09/797,517, filed Feb. 28, 2001 and entitled "METHOD AND SYSTEM FOR LOCATION TRACKING" (now U.S. Pat. No. 7,366,522), which is hereby incorporated by reference herein, and which application claims the benefit of U.S. Provisional Patent Application No. 60/185,480, filed Feb. 28, 2000, and entitled "METHOD AND SYSTEM FOR LOCATION TRACKING", which is hereby incorporated by reference herein.

BACKGROUND OF THE INVENTION

1. Field of the Invention

The present invention relates to computing or communication devices and, more particularly, to location tracking of computing or communication devices.

2. Description of the Related Art

Today, various types of or computing devices having communication capabilities (e.g., wireless communication devices) are available. Examples of computing devices having communication capabilities include pagers, mobile phones, personal digital assistants (PDAs), palm-top computers, and electronic schedulers.

Recently, computing devices have been able to detect their location though Global Positioning Satellites (GPS) or with the assistance of a network (e.g., cellular network). As an example, U.S. Pat. No. 5,959,557 describes a system in which a GPS receiver is used to measure a position of a mobile unit (i.e., vehicle), and reports the position on a map. However, such conventional approaches do not allow for control and general utilization of the position information.

Thus, there is a need for ways to utilize position information of mobile computing devices.

SUMMARY OF THE INVENTION

Broadly speaking, the invention relates to techniques for location tracking, location utilization, and dissemination and management of location information.

The invention can be implemented in numerous ways including, a method, system, device, and a computer readable medium. Several embodiments of the invention are discussed below.

As a method for monitoring position of a plurality of persons, each of the persons having a mobile computing device proximate thereto, one embodiment of the invention can, for example, include at least: obtaining locations for the mobile computing devices and thus the persons proximate thereto; receiving, from a viewing party, a request to view the location pertaining to a particular one of the persons; determining whether the viewing party is permitted to receive the location of the particular one of the persons, such determining comprising sending a location access request notification to a mobile computing device for approval or disapproval of the location access request, the mobile computing device receiving the location access request notification is associated with a party other than the viewing party; and delivering, to the viewing party, the location pertaining to the particular one of the persons provided that it is determined that the viewing party is permitted to receive such a response.

As a location monitoring system, one embodiment of the invention can, for example, include at least: a plurality of mobile electronic devices supported by a wireless network, each of the mobile electronic devices being associated with and proximate to a corresponding object; and a computing device operatively connectable to the wireless network. The computing device stores locations of each of the mobile electronic devices, and the computing device managing authorization for access the locations of the mobile electronic devices via one or more networks. In managing authorization for access to locations of the mobile electronic devices, one embodiment the computing device (i) receives, from a requestor, a request to view the location pertaining to a particular one of the objects; (ii) determines whether the requestor is authorized to receive the location of the particular one of the objects; and (iii) permits access or delivery of the location pertaining to the particular one of the objects to the requestor provided that it is determined that the requesting user is authorized to receive the location.

As a computer readable medium including at least computer program code tangible stored thereon for monitoring position of a plurality of persons, each of the persons having a mobile unit proximate thereto, one embodiment of the invention can, for example, include at least: computer program code for obtaining locations of the mobile units and thus the persons proximate thereto; computer program code for receiving, from a viewing party, a request to view the location pertaining to a particular one of the persons; computer program code for determining whether the viewing party is permitted to receive the location of the particular one of the persons, said computer program code for determining comprising computer program code for sending a location access request notification to a mobile unit for approval or disapproval of the location access request; and computer program code for delivering, the viewing party, the location pertaining to the particular one of the persons provided that said computer program code for determining determines that the viewing party is permitted to receive such a response.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 5A is a diagram of an exemplary authorization table in a location database;

FIG. 5B is a diagram of an exemplary location table in a location database;

DETAILED DESCRIPTION OF THE INVENTION

The invention pertains to techniques for location tracking, location utilization, and dissemination and management of location information.

Embodiments of this aspect of the invention are discussed below with reference to FIGS. 1-7B. However, those skilled in the art will readily appreciate that the detailed description given herein with respect to these figures is for explanatory purposes as the invention extends beyond these limited embodiments.

Figure 1:
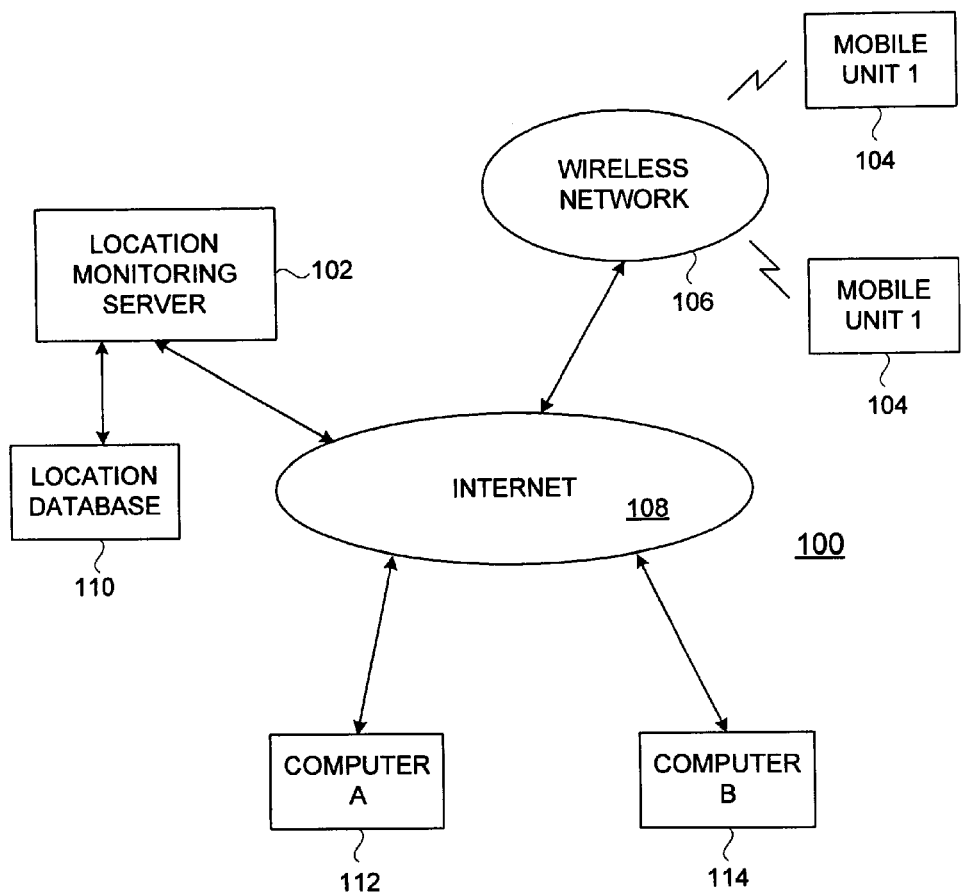
FIG. 1 is a block diagram of location monitoring system according to one embodiment of the invention.

FIG. 1 is a block diagram of location monitoring system 100 according to one embodiment of the invention. A location monitoring server 102 manages location information pertaining to a plurality of mobile units 104. The mobile units are typically attached to objects, such as people, vehicles, or containers. A wireless network 106 enables the mobile units 104 to communicate with the location monitor server 102. In one embodiment, the wireless network 106 couples to the Internet 108 (or other data network). The location monitoring server 102 also couples to the Internet 108. Location information associated with the mobile units 104 is thus able to be delivered to the location monitoring server 102 through the wireless network 106 and the Internet 108. A location database 110 coupled to the location monitoring server 102 can store the location information for the mobile units 104. The location monitoring server 102 is then able to utilize the location information by accessing the data stored in the location database 110. The location database 110 can reside on the location monitoring server or a separate local or remote computer.

The location monitoring system 100 can also include remote computers 112 and 114 that can couple to the Internet 108 through various means. Once coupled to the Internet 108, the remote computers 112 and 114 can access the location monitoring server 102 to receive location related services or to otherwise make use of the location information.

Each mobile unit can obtain location information on its location and forward the location information to the location monitoring server (web server). The location information can be forwarded to the location monitoring server by a variety of ways. One way is through use of a Short Message Service (SMS) message. The location information can also be obtained by a variety of methods. One method is to provide a Global Positioning Satellite (GPS) device within the mobile units. With GPS, the location information obtained can be distances to a plurality of global positioning satellites or can be a determined location from processing of the distances. When only the distances are provided, then the mobile unit merely sends the distances and need not perform processing to determine the location from the distances (instead a server can do so). Another method is to use location information obtained from a wireless network. With this method, the wireless network can provide location information on some or all of said mobile computing devices to the location monitoring server. In this case, the mobile units need not participate in obtaining the location information. As yet another method, a combination of these or other methods can be used to gather an accurate location for the mobile devices. For example, the location monitoring server could be provided with location information provided from the wireless network as well as location information provided by the mobile units themselves. By using the location information from both sources, more accurate and reliable location determination is able to be performed.

Figure 2:
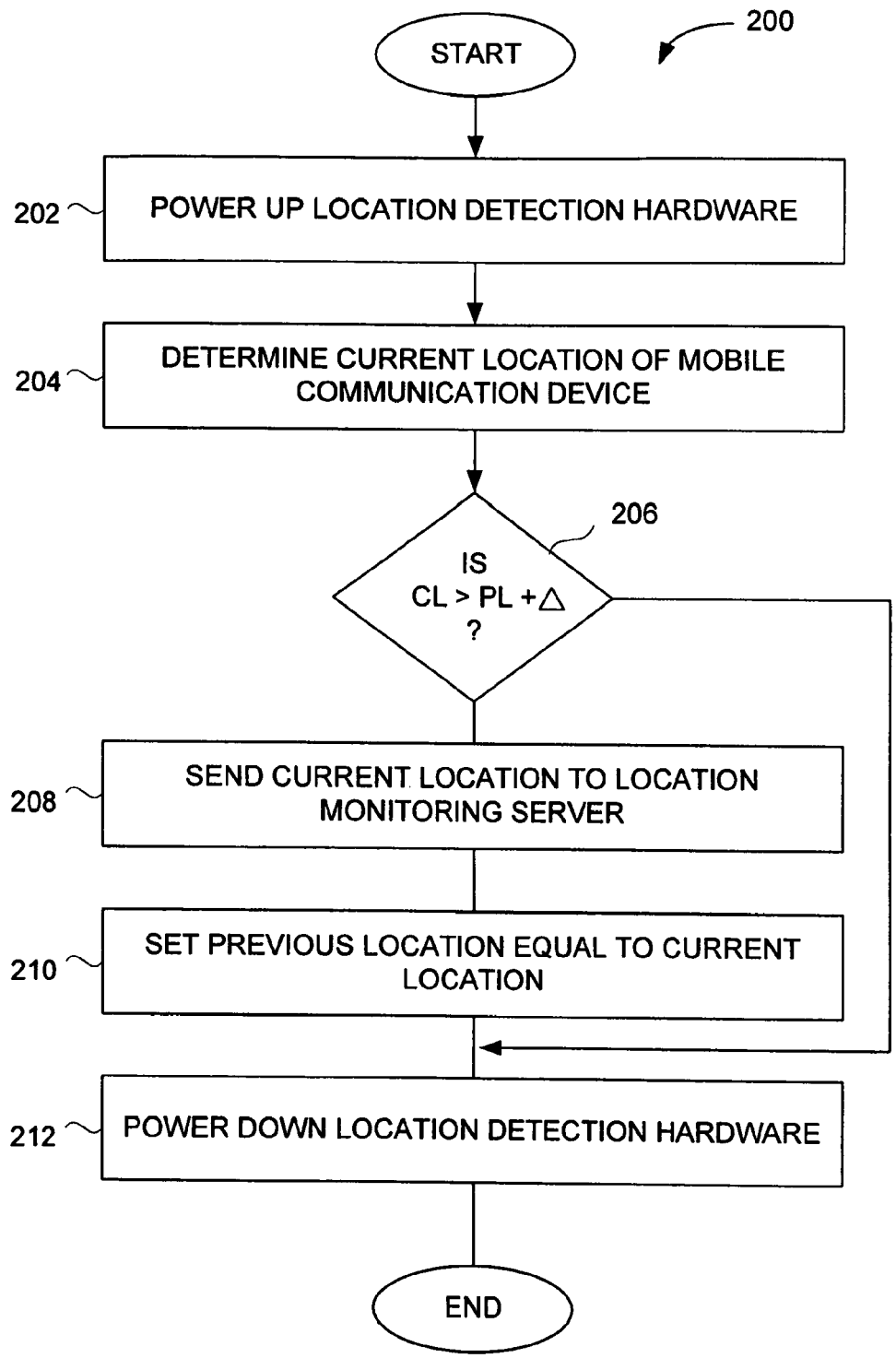
FIG. 2 is a flow diagram of client-side location processing according to one embodiment of the invention.

FIG. 2 is a flow diagram of client-side location processing 200 according to one embodiment of the invention. The client-side location processing 200 is performed on a client device, such as the mobile units 104 illustrated in FIG. 1.

The client-side location processing 200 initially powers-up 204 the location detection hardware within the client device. Next, the current location of the mobile communication device (client device) is determined 206. A decision 208 then determines whether the current location (CL) is greater than the previous location (PL) by more than a delta amount (Δ). When the decision 208 determines that the current location is not greater than the previous location by more than the delta amount, the current location is sent 208 to the location monitoring server. Here, the current location can be sent to the location monitoring server in a variety of different electronic ways. These ways include email, file transfer, etc. Then, the previous location is set 210 equal to the current location. Following the operation 210, as well as directly following the decision 208 when the current location does not exceed the previous location by more than the delta amount, the location detection hardware within the mobile communication devices is powered-down 212. Following the operation 212 the client-side location processing 200 is complete and ends.

According to this embodiment, the client device powers up to send its current location to a location monitoring server and then powers down to conserve power usage. In the embodiment shown in FIG. 2, the current location is sent to the location monitoring server only when it differs from the previous location by more than a predetermined amount. This conserves not only network bandwidth but also power usage at the client device.

Alternatively, the new location could be determined and/or sent only after a sensor internal to the client device (mobile unit) indicates that it has undergone significant movement since the previous location was obtained. A wide variety of sensors can be used. For example, motion sensors are readily available that indicate distances walked or run. Using such a sensor would reduce the frequency with which the new location should be determined and/or transmitted, thus saving network bandwidth and conserving power consumption. Such a motion sensor can be built into the client device, then if minimal motion detected, then no location detection need be triggered (or triggered less frequently). This provides automatic shut down of circuitry within the client device when the client device is not moving, in the evening (e.g., user sleeping), in a meeting, in one's office at work, etc.

As another alternative, invoking of the client-side location processing 200 can be performed periodically in accordance with a predetermined period. The predetermined period for the periodic location determination can vary with time of day and day of week. For example, the location determination can be made more frequently during the day and less frequently in the evening. As a further example, different predetermined period can be assigned for different days of the week.

As still another alternative, the client-side location processing 200 can be invoked only when a thermal sensor provided with the client device indicates that the mobile device is being worn by its user. Here, the thermal sensor could be utilized to effectively turn off the location monitoring or transmission circuitry and thus conserve power when the client device is not being worn by its user.

As yet still another alternative, the location monitoring server or some other server could send a request for location information to a client device and thus invoke the acquisition of the current location on the client device. In this regard, the request for the location information could be sent to the client devices only when such information is being remotely monitored by another. Such techniques would also facilitate conservation of power utilization on the client device as well as network bandwidth.

The determination of the location of the client device can thus be triggered or invoked by the client device itself or a location monitoring server (or other remote server) using any of a variety of ways (used separately or in combination). The location of the client device (mobile device) can be determined by the client device itself (e.g., using GPS), by a wireless network infrastructure, or through a combination of both.

Figure 3:
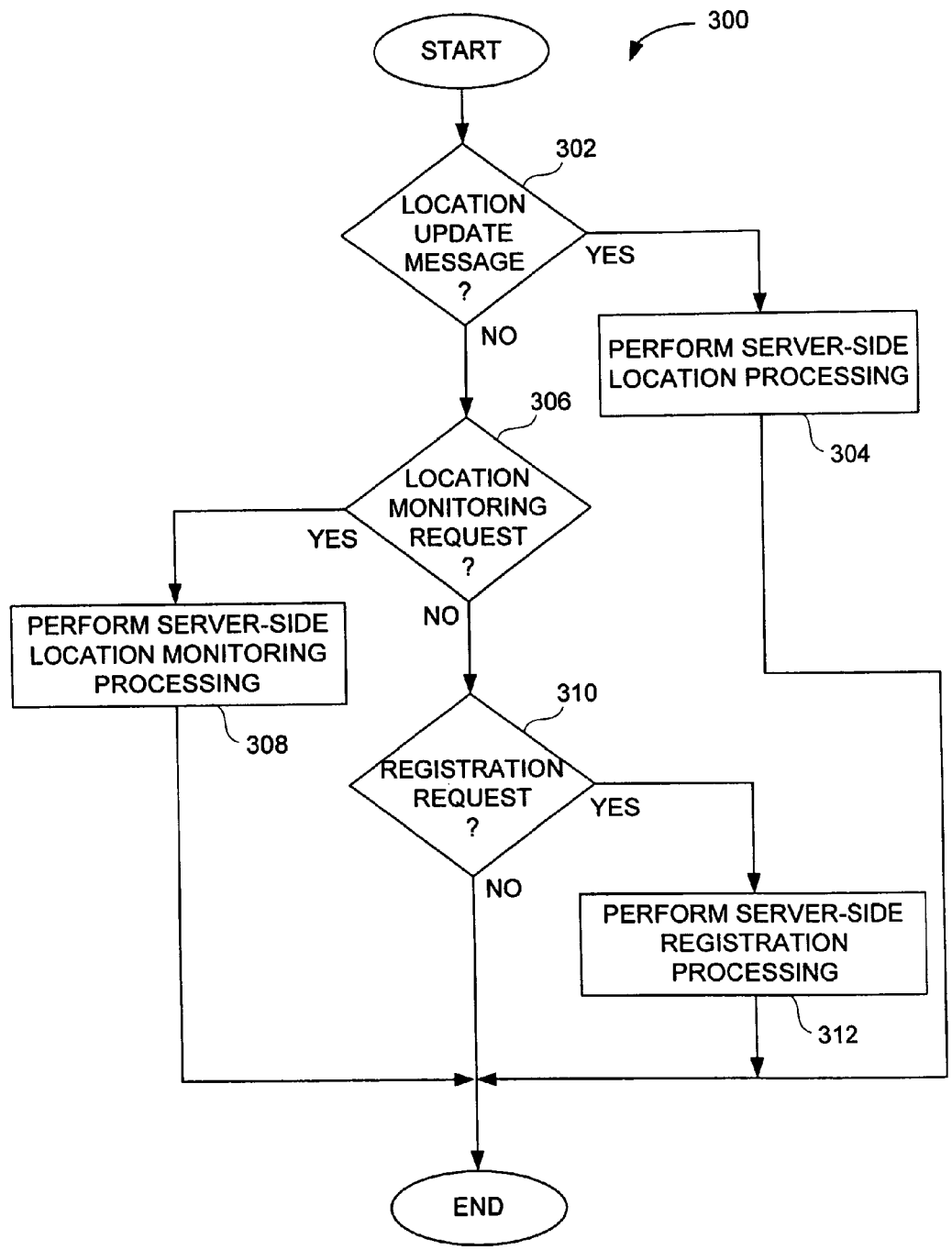
FIG. 3 is a flow diagram of server-side location management processing according to one embodiment of the invention.

FIG. 3 is a flow diagram of server-side location management processing 300 according to one embodiment of the invention. The server-side location management processing 300 begins with a decision 302 that determines whether a location update message has been received. Here, the location update message is a message being sent to the location monitoring server by a particular one of the mobile units. When the decision 302 determines that a location update message has been received, then server-side location processing is performed 304. The server-side location processing is able to determine the location of the mobile unit (mobile communication device) and store the location into a location database, such as the location database 110 as illustrated in FIG. 1. Additionally, the server-side location processing can notify interested registered viewers. Additional information on the server-side location processing is discussed below with respect to FIG. 4.

On the other hand, when the decision 302 determines that a location update message has not been received, then a decision 306 determines whether a location monitoring request has been received. When the decision 306 determines that a location monitoring request has been received, server-side location monitoring processing is performed 308. As an example, a location monitoring request is received by remote computer, such as one of the computers 112 and 114 illustrated in FIG. 1. The server-side location monitoring processing is able to provide viewers (e.g., registered viewers at the remote computers) with location or position of the one or more mobile units (or associated objects) of interest. The server-side location monitoring processing is further discussed below with respect to FIG. 6.

Alternatively, when the decision 306 determines that a location monitoring request has not been received, then a decision 310 determines whether a registration request has been received. Typically, the registration request would be received at the location monitoring server and would have been sent by one of the remote computers 112 or 114 (or their users). In any case, when the decision determines that a registration request has been received, server-side registration processing is performed 312. The server-side registration processing generally operates to register a user, or the user's computer, for use with the location monitoring system such that location information is able to be accessed and viewed on the viewer's computer. In this regard, various features provide for the mobile users to control who is able to view their location, as well as to send alerts or notifications to authorized registered viewers when certain location-based events occur. Additional details on the server-side registration processing are discussed below with respect to FIGS. 7A and 7B.

Following the operations 304, 308 and 312, the server-side location management processing 300 is complete and ends. However, the server-side location management processing 300 is effectively invoked when an incoming message or request is received at the location monitoring server.

Although not shown in FIG. 3, when a location monitoring request is received from a monitoring party, prior to performing the server-side location monitoring processing, the monitoring party must login with an appropriate user name and/or password. This allows restricted access to the location information. In one embodiment, the users of the mobile units can control whether monitoring parties are given access to their location information by authorizing certain monitoring parties.

Figure 4:
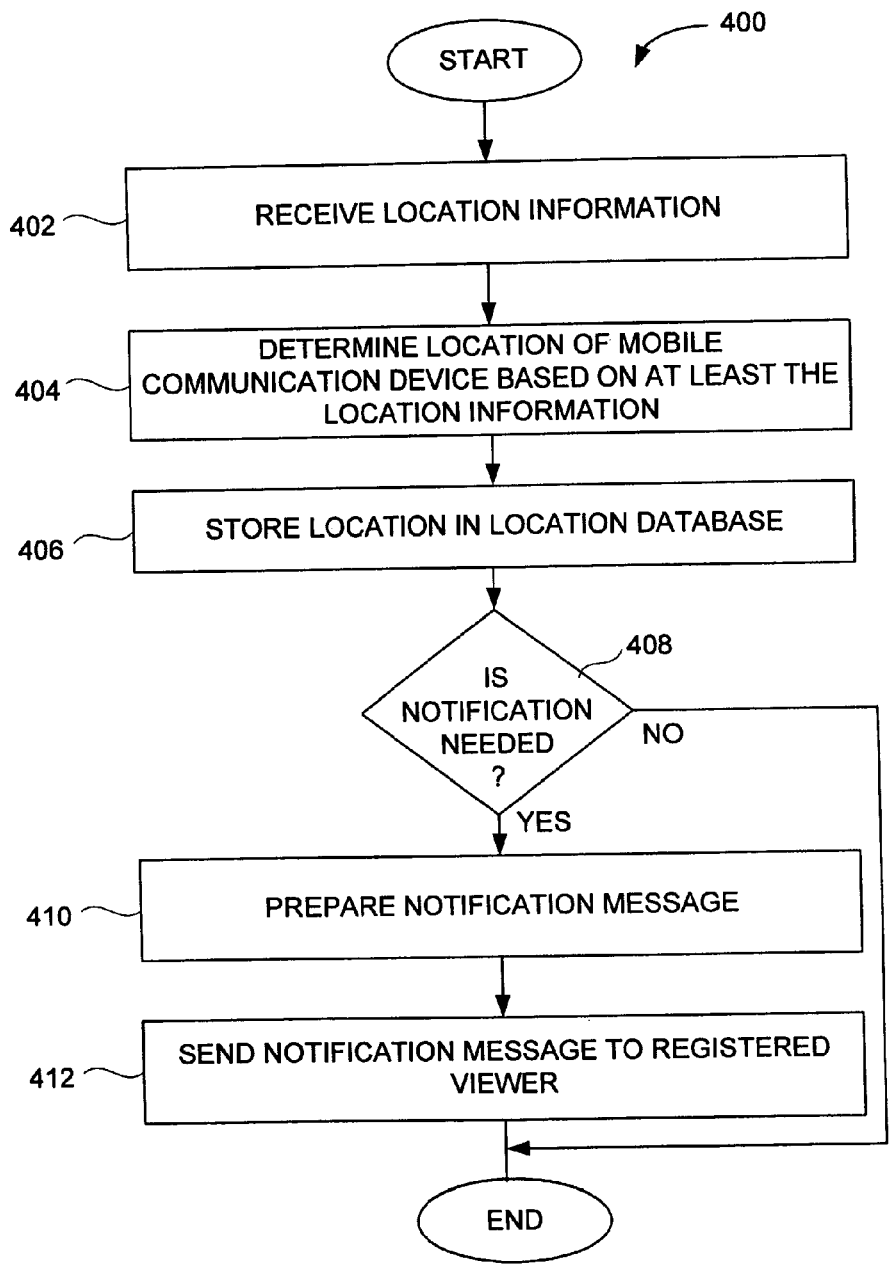
FIG. 4 is a flow diagram of server-side location processing according to one embodiment of the invention.

FIG. 4 is a flow diagram of server-side location processing 400 according to one embodiment of the invention.

The server-side location processing 400 is, for example, performed by a location monitoring server, such as the location monitoring server 102 illustrated in FIG. 1. The server-side location processing 400 initially receives 402 location information. Typically, the location information is received from a mobile communication device (mobile unit) and/or a carrier network (e.g., wireless network). Next, the location of the mobile communication device is determined 404 based on at least the location information. Here, the location information could itself be sufficient to enable the determination of the location of the mobile communication device. Alternatively, the location information could be combined with other information in order to determine the location of the mobile communication device (or to more accurately determine the location of the mobile communication device). In another embodiment, the location information could actually indicate the location. In any case, once the location of the mobile communication device has been determined 404, the location is stored 406 in a location database. As an example, the location database can be the location database 110 illustrated in FIG. 1.

Next, a decision 408 determines whether a notification is needed. Here, the server-side location processing 400 is able to send notifications to registered viewers as appropriate. The decision 408 determines whether a notification is needed to inform one or more registered viewers about the location information that has just been received and processed. Hence, when the decision 408 determines that a notification is needed, a notification message is prepared 410. Then, the notification message is send 412 to the one or more appropriate registered viewers. Following the operation 412, as well as directly following the decision 408 when no notifications are needed, the server-side location processing 400 is complete and ends.

As noted above, the server-side location processing 400 includes the decision 408 that determines whether any notification is needed. Here, based on the location of the mobile communication device, various notifications can be initiated. The various notifications can, for example, alert of a predetermined location, alert of an unauthorized region, alert of change in location, etc. The notification can be sent to the monitoring party through an email message (including two-way pager message), an instant response web-based message, through a web page provided at the mobile communication device, telephone message, and the like.

FIG. 5A is a diagram of an exemplary authorization table 500 in a location database. The exemplary authorization table 500 includes a row of information for each mobile device being monitored. Each row contains information on: mobile device identifier, user, supervisor (monitoring party), password, and whether logged in.

FIG. 5B is a diagram of an exemplary location table 550 in a location database. The exemplary location table 550 includes a row of location information for each of the mobile devices being monitored. Each row contains information on: mobile device identifier, current location, and previous location. The location can include much more historical information to keep a log of the locations of the mobile device over an extended period of time (e.g., day, week, month, year).

Figure 6:
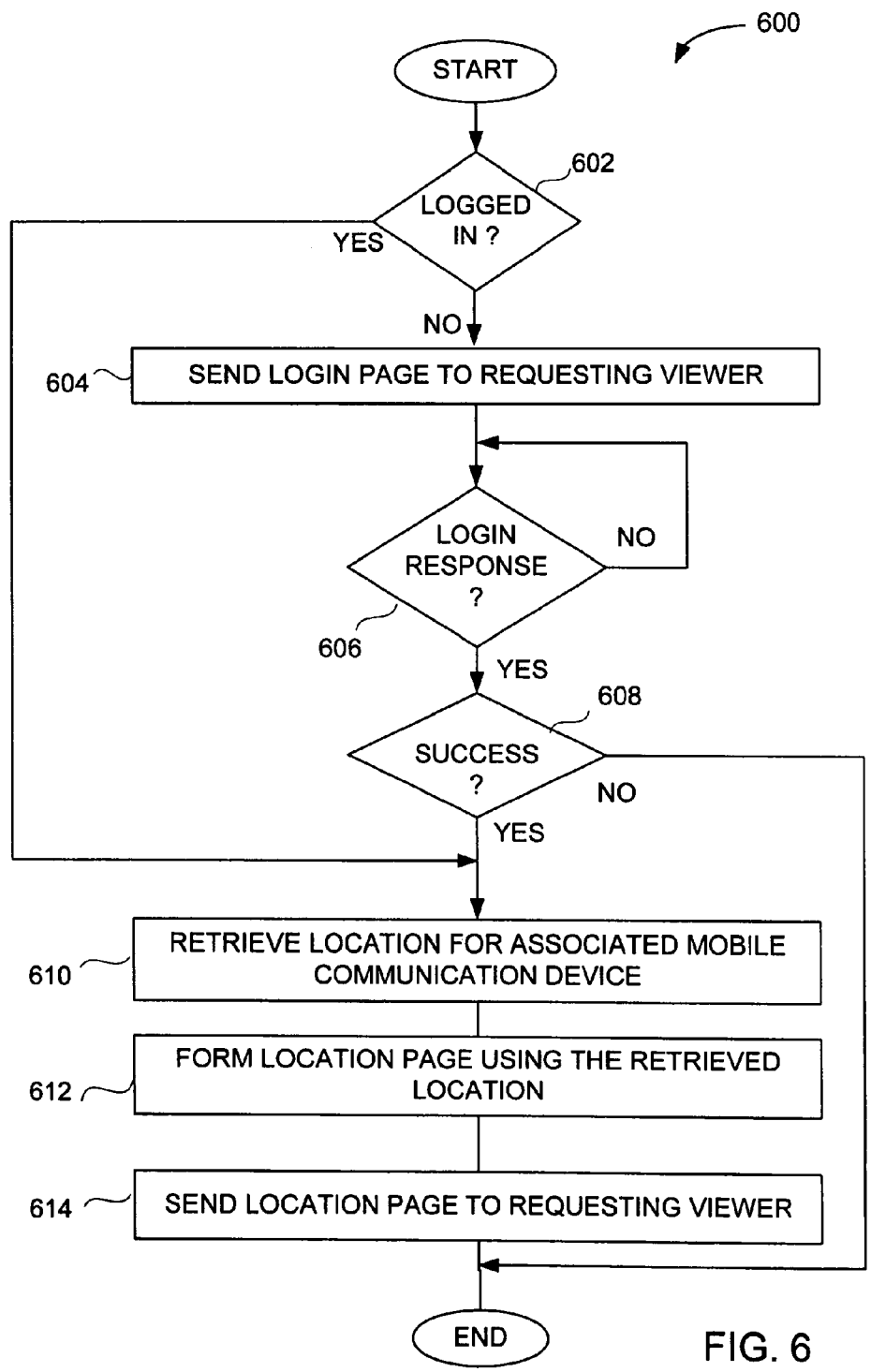
FIG. 6 is a flow diagram of server-side location monitoring processing.

FIG. 6 is a flow diagram of server-side location monitoring processing 600 according to one embodiment of the invention. The server-side location monitoring processing 600 begins with a decision 602 that determines whether a requesting viewer (monitoring party) has logged-in. Here, typically a request is received from a requesting viewing that seeks to either to log-in or to receive a location page. Hence, the decision 602 initially determines whether the requesting viewer is logged-in. When the decision 602 determines that the requesting viewer is not yet logged-in, then a log-in page is sent 604 to the requesting viewer. Then, a decision 606 waits for a log-in response. When the decision 606 determines that a log-in response has not yet been received, the server-side location monitoring processing 600 effectively awaits a log-in response (or a suitable time-out). Once the decision 606 determines that a log-in response has been received, then a decision 608 determines whether the log-in is successful. When the decision 608 determines that the log-in is not successful, then the server-side location monitoring processing 600 is complete and ends with the requesting viewer being denied access to the location related information. On the other hand, when the decision 608 determines that the log-in has been successful, as well as directly following the decision 602 when the requesting viewer is already logged-in, the location for the associated mobile communication device (mobile unit) is retrieved 610. As an example, the location can be retrieved from the location database 110 by the location monitoring server 102 illustrated in FIG. 1. Then, a location page using the retrieved information can be formed 612. Here, the location page represents the formatting of the location information into a suitable format, such as a document, that can be delivered to the requesting viewer. As an example, the location page can be a marked-up language document such as HTML, XML, HDML, or other markup language. The location page can also be customized for the type of computing device being utilized by the requesting viewer. Then, the location page is sent 614 to the requesting user. Following the operation 614, the server-side location monitoring processing 600 is complete and ends with the requesting viewer having received the requested location information.

Following successful login by a requesting viewer (monitoring party), the location for the mobile communication device that the requesting viewer has been authorized to receive is able to be retrieved. Then, the location is provided (i.e., sent) to the requesting viewer. In one embodiment, the location is part of a web page that is sent to the requesting viewer.

A server-side registration processing allows a viewer (requesting viewer) to request to view the location of a particular mobile communication device or it associated object. Access is denied if the viewer is not authorized. In one embodiment, the authorization can be controlled by the owner or user of the particular mobile communication device. The server-side registration processing also allows the viewer to set options. The options that can be set are numerous. Examples of the options include notifications or alerts, type of alert or notification (phone, pager, email, etc.), unauthorized or authorized locations, save history or not, labels for different locations (e.g., home, school, work, etc.). By saving the history (i.e., location history), the viewer is able to subsequently examine a history of movement. The history of movement can be presented to the viewer in textual or graphical formats.

Figure 7A:
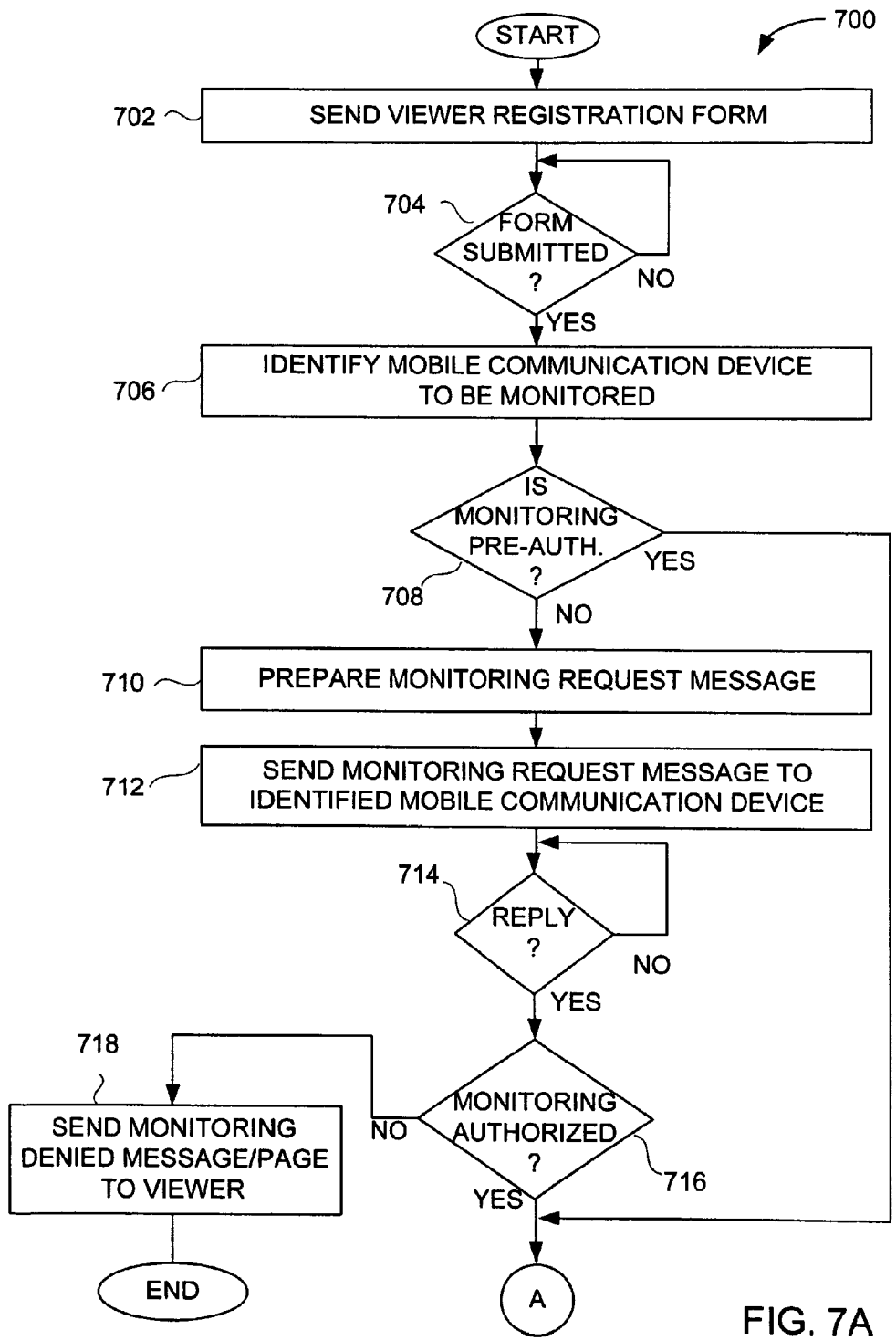
FIGS. 7A and 7B are flow diagrams of server-side registration processing.
Figure 7B:
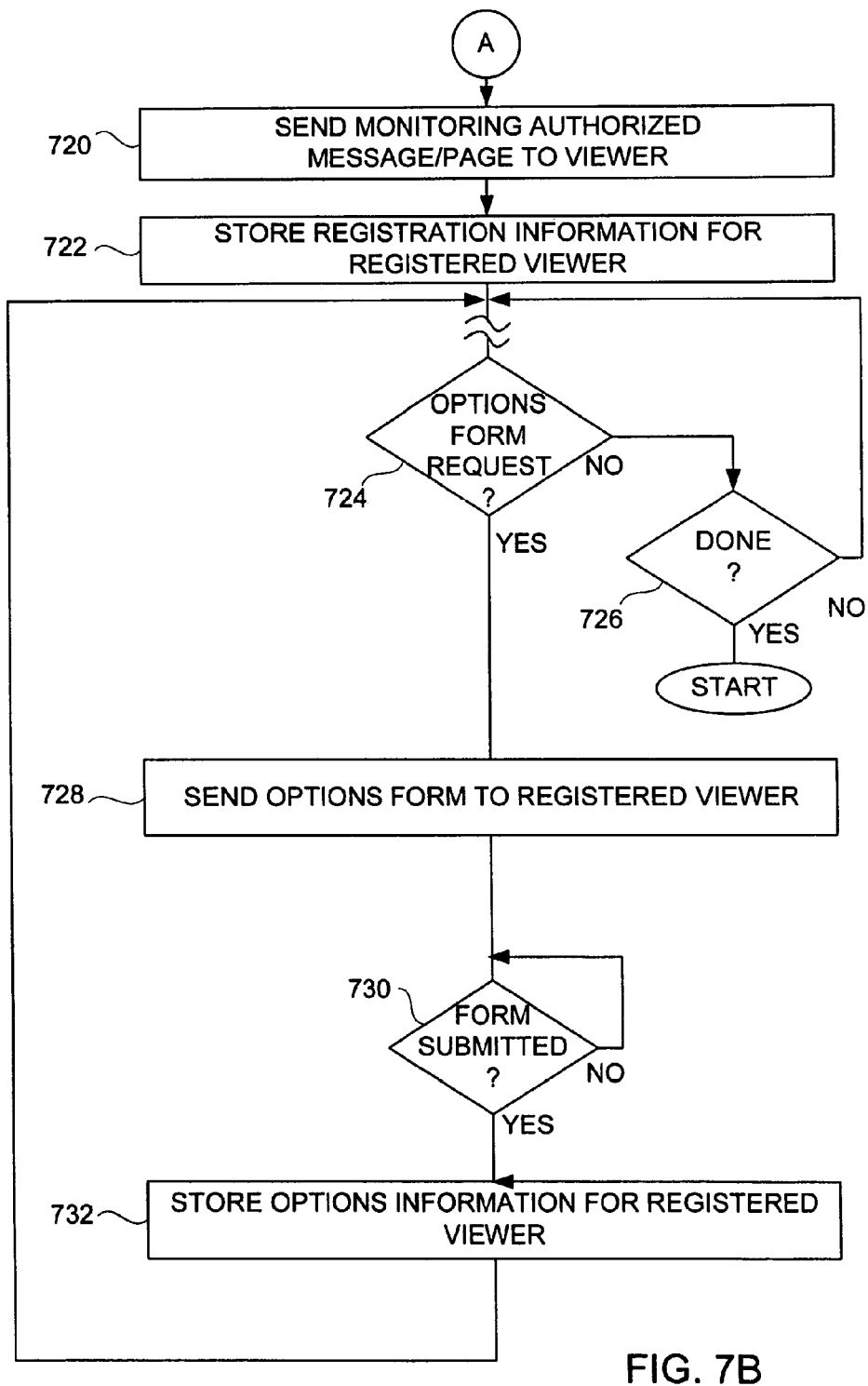

FIGS. 7A and 7B are flow diagrams of server-side registration processing 700 according to one embodiment of the invention. The server-side registration processing is, for example, performed by the location monitoring server 102 illustrated in FIG. 1.

The server-side registration processing 700 initially sends 702 a viewer registration form to a user attempting to register with the location monitoring server. As an example, the viewer registration form can be delivered to a computer associated with the user over the Internet and be displayed in a browser application associated with the user's computer. After the viewer registration form has been sent 702 to the viewer, a decision 704 determines whether the registration form has been submitted. Here, the server-side registration processing 700 is awaiting the return of the viewer registration form. When the decision 704 determines that the viewer registration form has not been returned, then the server-side registration processing 700 awaits its submission. On the other hand, when the decision 704 determines that the viewer registration form has been submitted (or times-out), then the mobile communication device to be monitored is identified 706. The mobile communication device to be monitored can be identified 706 from the information provided in the viewer registration form or from other information obtained from the viewer (e.g., from a separate page or form submitted by the viewer).

Next, a decision 708 determines whether monitoring of the particular mobile communication device has been pre-authorized. When the decision 708 determines that the monitoring for the particular mobile communication device has not been pre-authorized, then a monitoring request message is prepared 710. The monitoring request message is then sent 712 to the particular mobile communication device identified 706. At this point, the server-side registration processing 700 is effectively waiting for a reply from the particular mobile communication device or its user as to whether or not the requested monitoring is authorized. When a decision 714 receives a reply to the request for authorization, then a decision 716 determines whether the reply has authorized monitoring. When the decision 716 determines that monitoring has not been authorized (i.e., monitoring has been denied) then a monitoring denied message/page is sent 718 to the viewer. Thereafter, a server-side registration processing 700 is complete and ends.

Following the decision 716 when the monitoring has been authorized, as well as directly following the decision 708 when the monitoring has been pre-authorized, a monitoring authorized message/page is sent 720 to the viewer. The monitoring authorized message/page informs the viewer that the requested monitoring of the particular mobile communication device or its associated object has been approved. Then, registration information for the registered viewer is stored 722.

Thereafter, whenever a registered user desires to set options with respect to the manner in which they monitor location of mobile communication devices or its associated object, such registered viewers can complete and submit an options form. Hence, a decision 724 determines whether an options form request has been received. When the decision 724 determines that an options form request has not been received, then a decision 726 determines whether the server-side registration processing 700 is complete. When the decision 726 determines that the registration is complete (done), then the server-side registration processing 700 is complete and ends. On the other hand, when the decision 726 determines that the server-side registration processing 700 is not complete, then the server-side registration processing 700 returns to repeat the operations following the operation 722.

Alternatively, when the decision 724 determines that an options form request has been received, then an options form is sent 728 to the registered viewer. Then, a decision 730 determines whether the options form has been submitted. When the decision 730 determines that the options form has not yet been submitted, then the server-side registration processing 700 awaits submission of such a form. When a decision 730 determines that the options form has been submitted, then the options information provided by the options form is stored 732 for the registered viewer. Following the operation 732, the server-side registration processing 700 returns to repeat the operations following the operation 722.

It should be noted that the server-side registration processing 700 need not wait for the form submission at operations 704 or 730, or the reply message at operation 714, but can instead utilize a database or other data store to store state information such that the server-side registration processing 700 can proceed efficiently without being blocked or held-up while waiting for feedback from viewers or users of mobile communication devices. Such is well know in the programming fields, particularly with Internet programming.

Still further the invention is suitable for tracking delivery or maintenance personnel or vehicles. When a delivery or service appointment is made, you can receive a code for the truck or person that is going perform the delivery or service. Then, on the delivery day (days) when the truck or person is to deliver to or service one's home or business, an alert message or notification can be sent to the requestor (e.g., home owner or office manager). As examples, the message or notification is electronic and include a page, email or telephone type messages or notifications. Hence, if the homeowner is impatiently waiting for the delivery, they can access the location of the truck or person that is to perform the delivery or service. Still further, the requestor may also obtain schedule information on the person or vehicle, and thus determine how many other are scheduled before you. The schedule could also be updated by the truck or person (or their business) to reflect an up-to-date version through out their day. Hence, the requestor is able to obtain additional information over the Internet without have to wait impatiently or having to phone the associated business for information.

The mobile unit (client device, mobile communications device or mobile computing device) is, for example, one of a pager, mobile phone, personal digital assistant, or reduced size portable computing device.

U.S. Pat. No. 5,959,557 is hereby incorporated herein by reference.

The invention can, at least partly, be embodied as computer readable code (computer readable program code) on a computer readable medium. The computer readable medium is any data storage device that can store data which can be thereafter be read by a computer system. Examples of the computer readable medium include read-only memory, random-access memory, CD-ROMs, magnetic tape, and optical data storage devices. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that location of objects can be tracked via the Internet. Another advantage of the invention is that objects, such as persons, can control the dissemination of their location information. Another advantage of the invention is that alerts or notification can be triggered based on locations of objects. Another advantage of the invention is that mobile computing devices providing location monitoring capabilities are small (e.g., wearable) and offer low power consumption (e.g., long battery life). Another advantage of the invention is that embodiments can operate without user input or actions.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A location monitoring system for managing access to location information of a plurality of mobile electronic devices supported by at least one wireless network, each of the mobile electronic devices being associated with and proximate to a corresponding object, said location monitoring system comprising:

a computing device operatively connectable to the wireless network, said computing device storing locations of said mobile electronic devices, and said computing device managing authorization for access to the locations of said mobile electronic devices via one or more networks, wherein in managing authorization for access to the locations of said mobile electronic devices, said computing device (i) receives, from a requestor, a request to view the location pertaining to a particular one of the objects; (ii) determines whether the requestor is authorized to receive the location of the particular one of the objects; and (iii) permits access or delivery of the location pertaining to the particular one of the objects to the requestor provided that it is determined that the requestor is authorized to receive the location, and wherein in determining (ii) whether the requesting user is authorized to receive the location of the particular one of the objects, said computing device (a) determines whether viewing of the location of the particular one of the objects is pre-authorized, and (b) sends, when the viewing is determined not to be pre-authorized, a location access request notification to a mobile electronic device corresponding to the particular one of the objects for approval or disapproval of the request to view the location pertaining to the particular one of the objects.

2. A location monitoring system as recited in claim 1, wherein said computing device alerts the mobile electronic device corresponding to the particular one of the objects that the location of the mobile electronic device corresponding to the particular one of the objects is being monitored.

3. A location monitoring system as recited in claim 1, wherein said computing device determines whether an electronic notification is to be sent to an authorized user based on the location of at least one of the mobile electronic devices, and wherein said computing device sends the electronic notification to the authorized user when it has been determined that an electronic notification is to be sent to the authorized user.

4. A location monitoring system as recited in claim 1, wherein one or more notification locations are defined by an authorized user through interaction with said computing device, wherein the one or more notification locations that have been defined are assigned location labels by the authorized user through interaction with the computing device, and wherein the location labels assigned by the authorized user are personal to the authorized user.

5. A location monitoring system as recited in claim 4, wherein said computing device determines whether the location of the mobile electronic device pertaining to the particular one of the objects is at one of the one or more notification locations, generates a notification when it is determined that the location of the mobile electronic device is at one of the one or more notification locations, and electronically sends the notification to the authorized user.

6. A location monitoring system as recited in claim 5, wherein said computing device receives location information from each of the mobile electronic devices.

7. A location monitoring system as recited in claim 5, wherein said determining whether the viewing party is permitted to access the location pertaining to the particular one of the persons establishes permission to access the location by way of a wireless exchange of information.

8. A location monitoring system as recited in claim 5,
wherein the authorized user must be registered with said computing device before the authorized user is authorized to access the location of one or more of the mobile electronic devices or the corresponding objects,
wherein at least one attribute of the notification depends on information provided by the authorized user during the registration of that user, and
wherein the at least one attribute of the notification provided by the authorized user during registration includes a type of notification or how often notification is to be provided.

9. A location monitoring system as recited in claim 8, wherein said computing device is a web server, and wherein at least a plurality of the mobile electronic devices are mobile communication devices having location detection capabilities.

10. A location monitoring system as recited in claim 1, wherein one or more notification locations are defined by an authorized user through interaction with said computing device, and wherein at least one notification location that has been defined is assigned a location label by the authorized user through interaction with the computing device.

11. A location monitoring system as recited in claim 1, wherein said computing device alerts the mobile electronic device corresponding to the particular one of the objects that the location of the mobile electronic device corresponding to the particular one of the objects is being monitored.

12. A location monitoring system as recited in claim 1,
wherein one or more notification locations are defined by an authorized user through interaction with said computing device, and wherein at least one notification location that has been defined is assigned a location label by the authorized user through interaction with the computing device, and
wherein said computing device alerts the mobile electronic device corresponding to the particular one of the objects that the location of the mobile electronic device corresponding to the particular one of the objects is being monitored.

13. A location monitoring system as recited in claim 1, wherein one or more notification locations are defined by an authorized user through interaction with said computing device, wherein the one or more notification locations that have been defined are assigned location labels by the authorized user through interaction with the computing device, and wherein the location labels assigned by the authorized user are personal to the authorized user.

14. A location monitoring system as recited in claim 13,
wherein the authorized user must be registered with said computing device before the authorized user is authorized to access the location of one or more of the mobile electronic devices or the corresponding objects,
wherein at least one attribute of the notification depends on information provided by the authorized user during the registration of that user, and
wherein the at least one attribute of the notification provided by the authorized user during registration includes a type of notification or how often notification is to be provided.

15. A location monitoring system as recited in claim 14, wherein said computing device determines whether the location of the mobile electronic device pertaining to the particular one of the objects is at one of the one or more notification locations, generates a notification when it is determined that the location of the mobile electronic device is at one of the one or more notification locations, and electronically sends the notification to the authorized user.

* * * * *